(12) United States Patent
Arakawa et al.

(10) Patent No.: US 11,031,884 B2
(45) Date of Patent: Jun. 8, 2021

(54) CONTROL DEVICE FOR VIBRATION ACTUATOR, METHOD OF CONTROLLING VIBRATION ACTUATOR, ROBOT, ELECTRONIC COMPONENT CONVEYANCE APPARATUS, PRINTER, PROJECTOR, AND VIBRATION DEVICE

(71) Applicant: Seiko Epson Corporation, Tokyo (JP)

(72) Inventors: Yutaka Arakawa, Hara-mura (JP); Kiichi Kajino, Matsumoto (JP)

(73) Assignee: Seiko Epson Corporation

( * ) Notice: Subject to any disclaimer, the term of this patent is extended or adjusted under 35 U.S.C. 154(b) by 631 days.

(21) Appl. No.: 15/962,006

(22) Filed: Apr. 25, 2018

(65) Prior Publication Data
US 2018/0316282 A1    Nov. 1, 2018

(30) Foreign Application Priority Data
Apr. 27, 2017    (JP) .............................. JP2017-088256

(51) Int. Cl.
*H02N 2/14*    (2006.01)
*H02N 2/00*    (2006.01)
*H02N 2/06*    (2006.01)
*H02N 2/02*    (2006.01)
*H02N 2/10*    (2006.01)

(52) U.S. Cl.
CPC ............. *H02N 2/008* (2013.01); *H02N 2/004* (2013.01); *H02N 2/0015* (2013.01); *H02N 2/062* (2013.01); *H02N 2/142* (2013.01); *H02N 2/026* (2013.01); *H02N 2/103* (2013.01)

(58) Field of Classification Search
CPC ...... H02N 2/008; H02N 2/026; H02N 2/0015; H02N 2/103; H02N 2/142; H02N 2/062
See application file for complete search history.

(56) References Cited

U.S. PATENT DOCUMENTS

| | | | |
|---|---|---|---|
| 9,479,087 B2 | 10/2016 | Kudo | |
| 2002/0057038 A1* | 5/2002 | Shibatani | ............... H02N 2/103 310/317 |
| 2002/0057040 A1* | 5/2002 | Shibatani | ............ H01L 41/0906 310/323.16 |
| 2006/0242806 A1 | 11/2006 | Sugahara | |
| 2017/0082828 A1* | 3/2017 | Sumioka | .................. G02B 7/04 |
| 2019/0036001 A1* | 1/2019 | Kajino | ................... H02N 2/006 |

FOREIGN PATENT DOCUMENTS

| | | | |
|---|---|---|---|
| JP | 2006-332616 A | 12/2006 | |
| JP | 2007-049881 A | 2/2007 | |
| JP | 2007-074829 A | 3/2007 | |
| JP | 2011-259559 A | 12/2011 | |

* cited by examiner

*Primary Examiner* — J. San Martin
(74) *Attorney, Agent, or Firm* — Harness, Dickey & Pierce, P.L.C.

(57) ABSTRACT

A control device for a vibration actuator includes a detection signal acquisition section adapted to obtain an alternating-current detection signal corresponding to a vibration of the resonator body from the resonator bodies, a phase difference detection section adapted to detect a phase difference between the drive signal and the detection signal with respect to the resonator bodies, a resonator body selection section adapted to select one from the resonator bodies, and a drive signal control section adapted to adjust a frequency of the drive signal so that the phase difference in the resonator body selected comes closer to a target value.

20 Claims, 17 Drawing Sheets

CONTROL DEVICE FOR VIBRATION ACTUATOR, METHOD OF CONTROLLING VIBRATION ACTUATOR, ROBOT, ELECTRONIC COMPONENT CONVEYANCE APPARATUS, PRINTER, PROJECTOR, AND VIBRATION DEVICE

BACKGROUND

1. Technical Field

The present invention relates to a control device for a vibration actuator, a method of controlling a vibration actuator, a robot, an electronic component conveyance apparatus, a printer, a projector, and a vibration device.

2. Related Art

The vibration actuator described in JP-A-2011-259559 (Document 1) has a driven body, and two resonators for driving the driven body. Further, the two resonators each have a projection having contact with the driven body, and are configured so that the driven body moves linearly by elliptically vibrating the projections. Further, in the vibration actuator of Document 1, the frequencies of the driving vibrations to be applied to the respective resonators are set so that the ellipticity changing frequency range of one of the resonators and the ellipticity changing frequency range of the other of the resonators overlap each other.

However, in the actuator of Document 1, there is a possibility that the range in which the ellipticity changing frequency ranges of the both resonators overlap each other is narrowed, and thus, the frequencies of the drive signals to be applied to the both resonators become significantly shifted from the resonance frequencies of the both resonators due to a difference in vibrational characteristics between the two resonators or an influence of disturbances such as a variation of pressing force of each of the resonators against the driven body and a variation of frictional force with the driven body. Therefore, in the actuator of Document 1, there is a problem that the actuator is poor in robustness (easy to be affected by an external factor), and effective drive cannot be performed.

SUMMARY

An advantage of some aspects of the invention is to provide a control device for a vibration actuator, a method of controlling a vibration actuator, a robot, an electronic component conveyance apparatus, a printer, a projector, and a vibration device each superior in robustness and capable of performing effective drive.

The advantage described above can be achieved by the following configurations.

A control device for a vibration actuator according to an aspect of the invention includes a driven body and a plurality of resonator bodies each having a contact part having contact with the driven body, and causes a rotational vibration in each of the contact parts of the plurality of resonator bodies by application of a common alternating-current drive signal to the plurality of resonator bodies, and transmits the rotational vibrations of the plurality of resonator bodies to cause the driven body to make a relative displacement, the control device including a detection signal acquisition section adapted to obtain an alternating-current detection signal corresponding to a vibration of the resonator body from each of the resonator bodies, a phase difference detection section adapted to detect a phase difference between the drive signal and the detection signal with respect to each of the resonator bodies, a resonator body selection section adapted to select one from the resonator bodies, and a drive signal control section adapted to adjust a frequency of the drive signal so that the phase difference in the resonator body selected comes closer to a target value.

According to the aspect of the invention, it is possible to obtain the control device for a vibration actuator superior in robustness and capable of efficient drive.

In the control device for a vibration actuator according to the aspect of the invention, it is preferable that the drive signal control section adjusts the frequency of the drive signal within a range higher than a resonance frequency of the resonator body.

According to the aspect of the invention with this configuration, it is possible to more accurately control the vibration actuator.

In the control device for a vibration actuator according to the aspect of the invention, it is preferable that in a relationship between the phase difference and the frequency of the drive signal, the target value is set on a high-frequency side with respect to the resonance frequency.

According to the aspect of the invention with this configuration, it is possible to more accurately control the vibration actuator.

In the control device for a vibration actuator according to the aspect of the invention, it is preferable that the resonator body selection section selects the resonator body largest in the phase difference from the plurality of resonator bodies.

According to the aspect of the invention with this configuration, the drive of the vibration actuator is stabilized.

In the control device for a vibration actuator according to the aspect of the invention, it is preferable that the resonator body selection section selects the resonator body smallest in the phase difference from the plurality of resonator bodies.

According to the aspect of the invention with this configuration, it becomes easy to tune the phase difference in the resonator body thus selected to the target value.

A control device for a vibration actuator according to an aspect of the invention includes a driven body and a plurality of resonator bodies each having a contact part having contact with the driven body, and causes a rotational vibration in each of the contact parts of the plurality of resonator bodies by application of a common alternating-current drive signal to the plurality of resonator bodies, and transmits the rotational vibrations of the plurality of resonator bodies to cause the driven body to make a relative displacement, the control device including a detection signal acquisition section adapted to obtain an alternating-current detection signal generated by the rotational vibration of the contact part from each of the resonator bodies, a reference phase difference generation section adapted to generate a reference phase difference as a phase difference from the drive signal to be a reference based on a detection signal obtained from each of the resonator bodies, and a drive signal control section adapted to adjust a frequency of the drive signal so that the reference phase difference comes closer to a target value.

According to the aspect of the invention, it is possible to obtain the control device for a vibration actuator superior in robustness and capable of efficient drive.

In the control device for a vibration actuator according to the aspect of the invention, it is preferable that the reference phase difference generation section detects the phase difference between the drive signal and the detection signal for each of the resonator bodies, and then obtains an average value of the phase differences in the respective resonator bodies as the reference phase difference.

According to the aspect of the invention with this configuration, it becomes easy to generate the reference phase difference. Further, it is possible to more efficiently vibrate each of the resonator bodies, and thus, the drive characteristics of the vibration actuator are further improved.

A method of controlling a vibration actuator according to an aspect of the invention is a method of controlling a vibration actuator including a driven body and a plurality of resonator bodies each having a contact part having contact with the driven body, and causing a rotational vibration in each of the contact parts of the plurality of resonator bodies by application of a common alternating-current drive signal to the plurality of resonator bodies, and transmitting the rotational vibrations of the plurality of resonator bodies to cause the driven body to make a relative displacement, the method including obtaining an alternating-current detection signal corresponding to a vibration of the resonator body from each of the resonator bodies, detecting a phase difference between the drive signal and the detection signal with respect to each of the resonator bodies, selecting one from the resonator bodies, and adjusting a frequency of the drive signal so that the phase difference in the resonator body selected comes closer to a target value.

According to the aspect of the invention, it is possible to obtain the method of controlling the vibration actuator superior in robustness and capable of efficient drive.

A method of controlling a vibrator actuator according to an aspect of the invention is a method of controlling a vibration actuator including a driven body and a plurality of resonator bodies each having a contact part having contact with the driven body, and causing a rotational vibration in each of the contact parts of the plurality of resonator bodies by application of a common alternating-current drive signal to the plurality of resonator bodies, and transmitting the rotational vibrations of the plurality of resonator bodies to cause the driven body to make a relative displacement, the method including obtaining an alternating-current detection signal generated by the rotational vibration of the contact part from each of the resonator bodies, generating a reference phase difference as a phase difference from the drive signal to be a reference based on a detection signal obtained from each of the resonator bodies, and adjusting a frequency of the drive signal so that the reference phase difference comes closer to a target value.

According to the aspect of the invention, it is possible to obtain the method of controlling the vibration actuator superior in robustness and capable of efficient drive.

A robot according to an aspect of the invention includes the control device for a vibration actuator according to the aspect of the invention.

According to the aspect of the invention, it is possible to appreciate the advantages of the control device for a vibration actuator according to the aspect of the invention, and it is possible to obtain the robot high in reliability.

An electronic component conveyance apparatus according to an aspect of the invention includes the control device for a vibration actuator according to the aspect of the invention.

According to the aspect of the invention, it is possible to appreciate the advantages of the control device for a vibration actuator according to the aspect of the invention, and it is possible to obtain the electronic component conveyance apparatus high in reliability.

A printer according to an aspect of the invention includes the control device for a vibration actuator according to the aspect of the invention.

According to the aspect of the invention, it is possible to appreciate the advantages of the control device for a vibration actuator according to the aspect of the invention, and it is possible to obtain the printer high in reliability.

A projector according to an aspect of the invention includes the control device for a vibration actuator according to the aspect of the invention.

According to the aspect of the invention, it is possible to appreciate the advantages of the control device for a vibration actuator according to the aspect of the invention, and it is possible to obtain the projector high in reliability.

A vibration device according to an aspect of the invention includes a driven body, a plurality of resonator bodies each having a contact part having contact with the driven body, and a processor, the vibration device causes a rotational vibration in each of the contact parts of the plurality of resonator bodies by application of a common alternating-current drive signal to the plurality of resonator bodies, and transmits the rotational vibrations of the plurality of resonator bodies to cause the driven body to make a relative displacement, and the processor obtains an alternating-current detection signal corresponding to a vibration of the resonator body from each of the resonator bodies, detects a phase difference between the drive signal and the detection signal with respect to each of the resonator bodies, selects one from the resonator bodies, and adjusts a frequency of the drive signal so that the phase difference in the resonator body selected comes closer to a target value.

According to the aspect of the invention, it is possible to obtain the vibration device superior in robustness and capable of efficient drive.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a control device for a vibration actuator, a method of controlling a vibration actuator, a robot, an electronic component conveyance apparatus, a printer, a projector, and a vibration device according to the invention will be described in detail based on some preferred embodiments shown in the accompanying drawings.

First Embodiment

Firstly, a drive device according to a first embodiment of the invention will be described.

Figure 1:
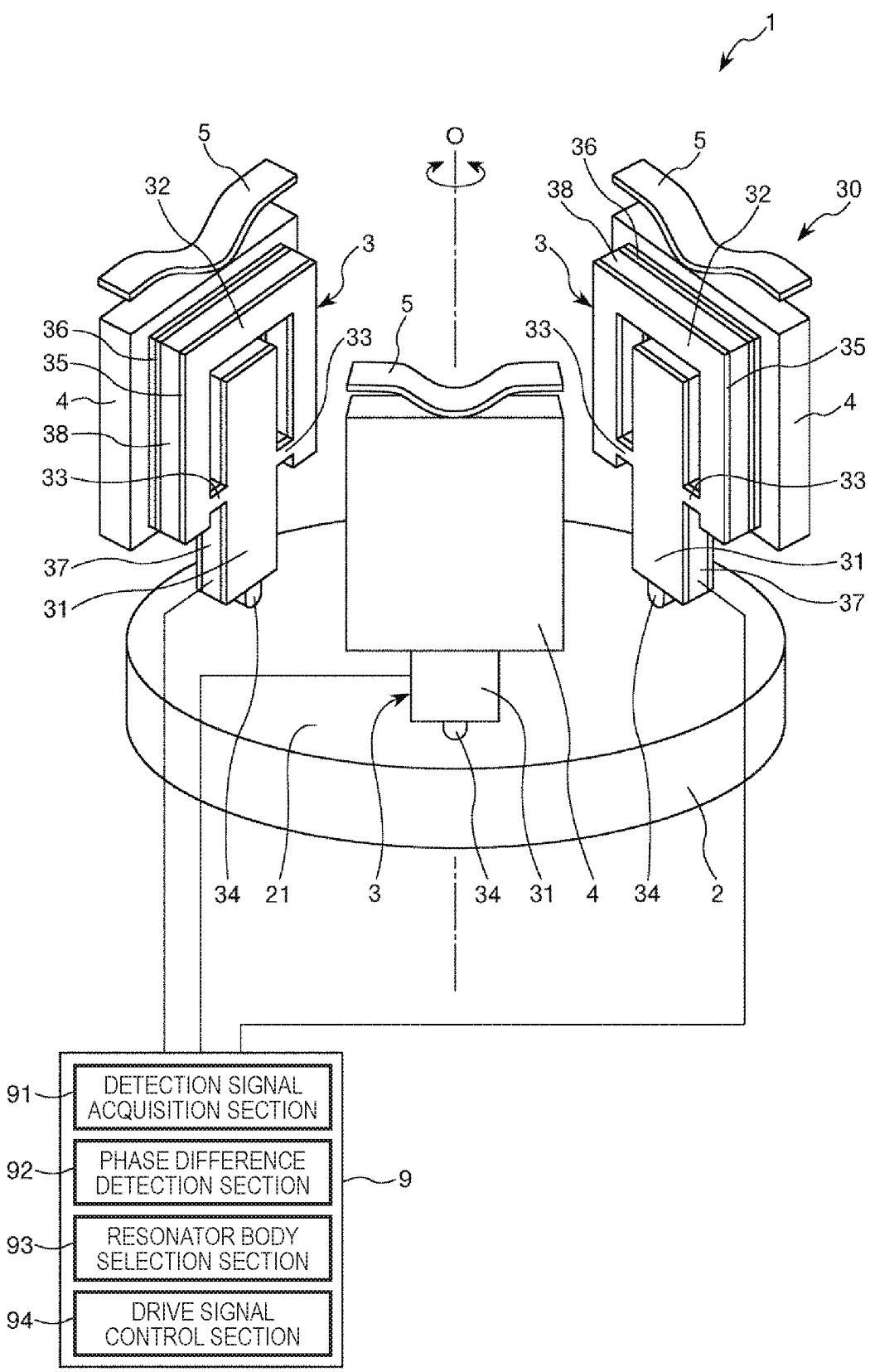
FIG. 1 is a perspective view showing a drive device according to a first embodiment of the invention.
Figure 2:
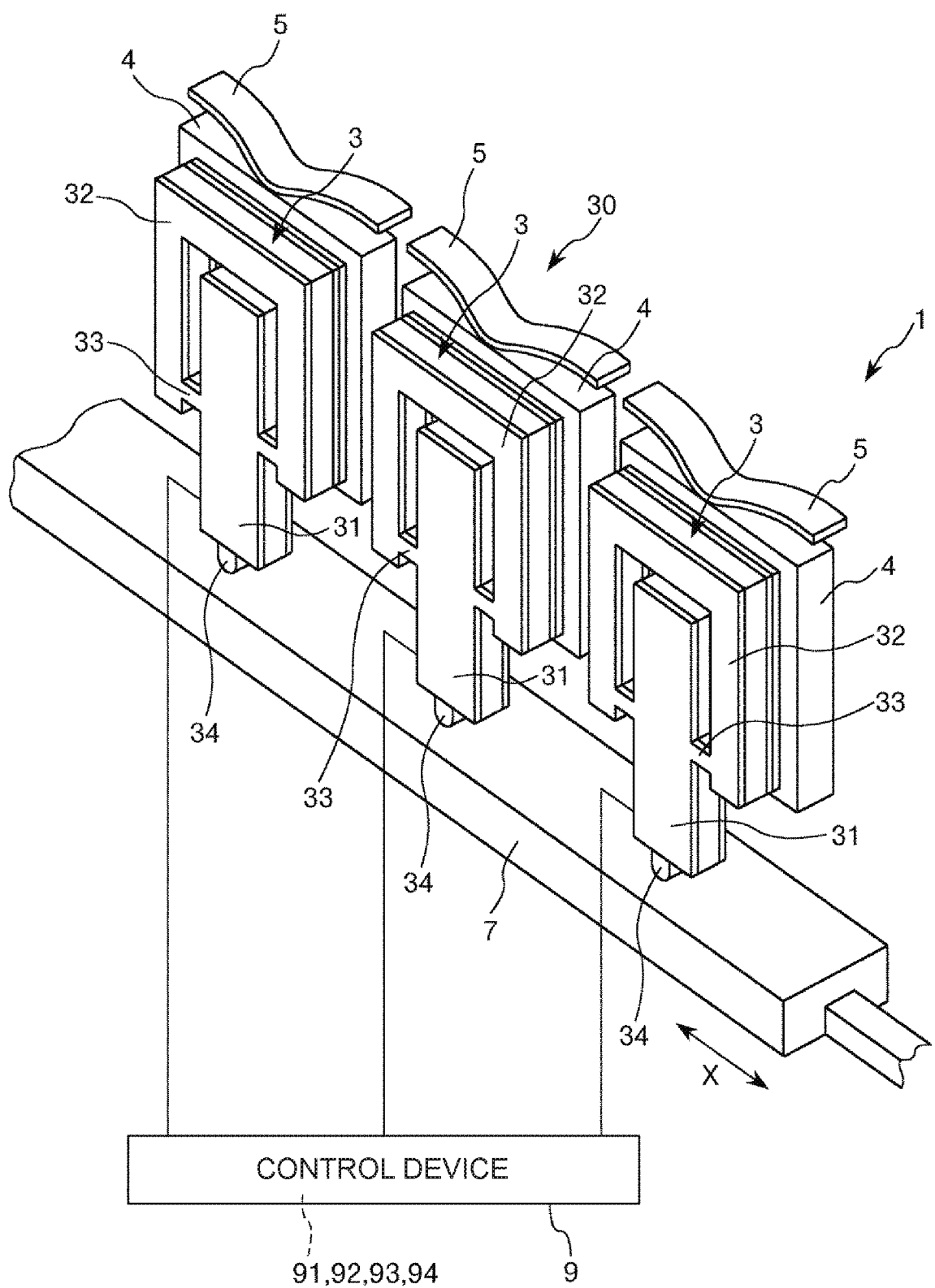
FIG. 2 is a perspective view showing a modified example of the drive device shown in FIG. 1.
Figure 3:
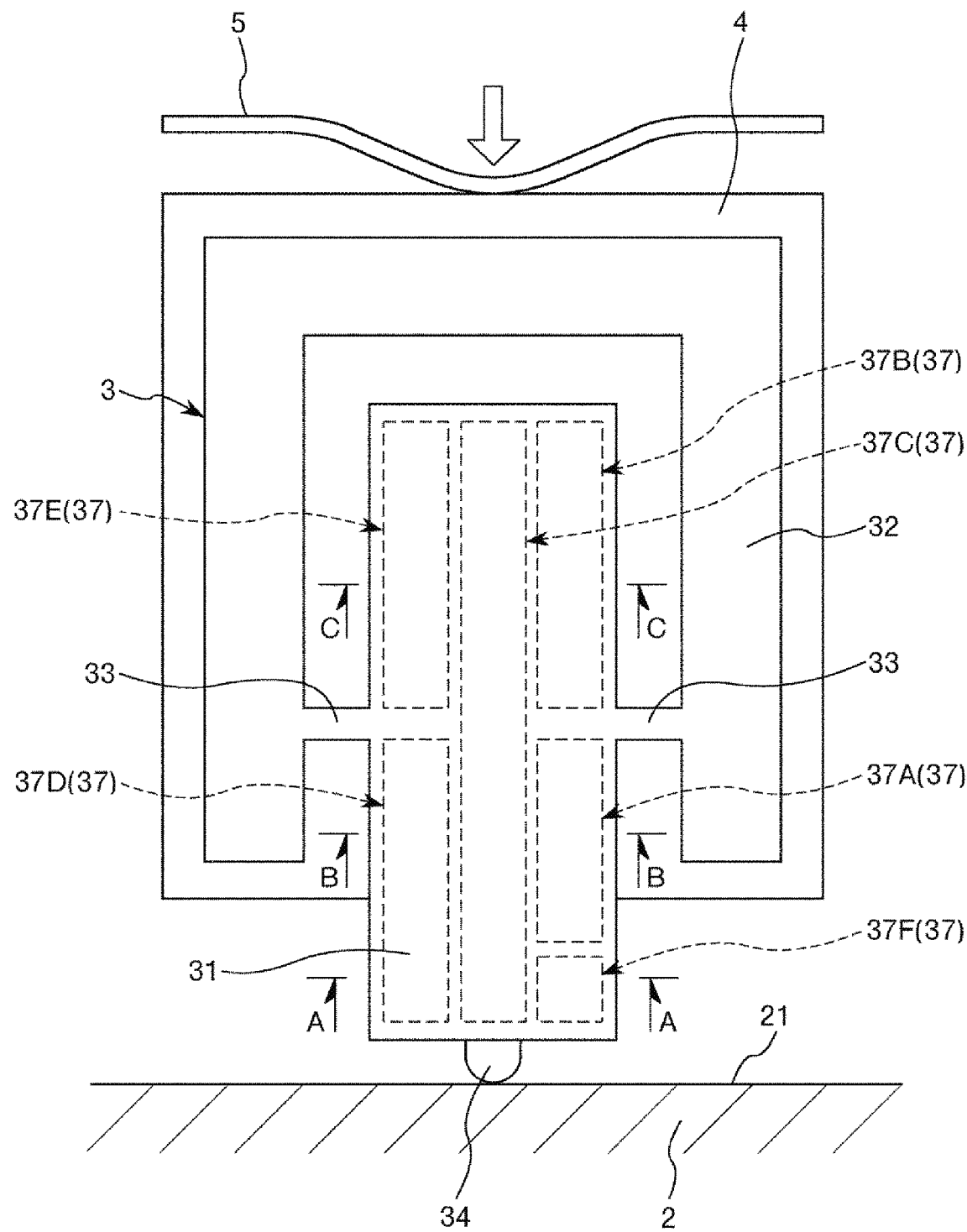
FIG. 3 is a plan view of each of resonator bodies provided to the drive device shown in FIG. 1.
Figure 4:
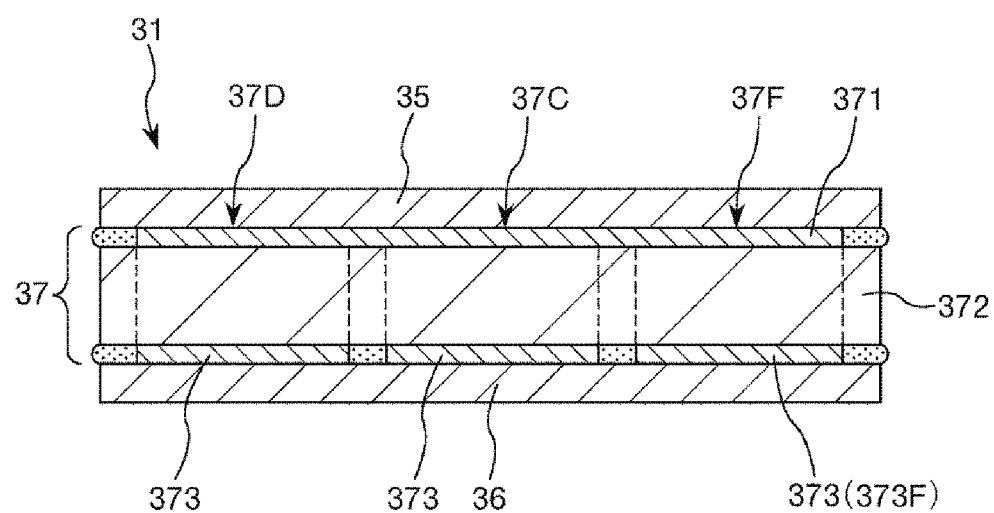
FIG. 4 is a cross-sectional view along the line A-A in FIG. 3.
Figure 5:
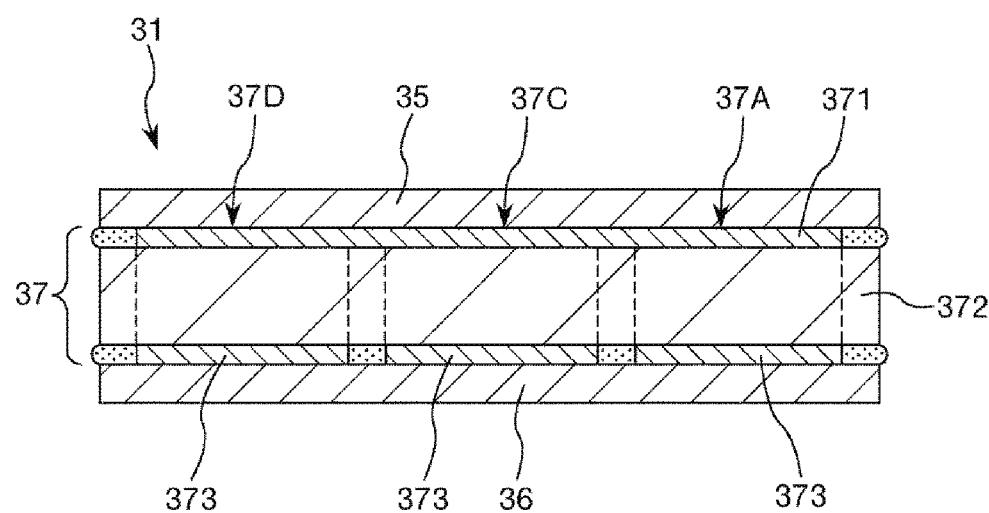
FIG. 5 is a cross-sectional view along the line B-B in FIG. 3.
Figure 6:
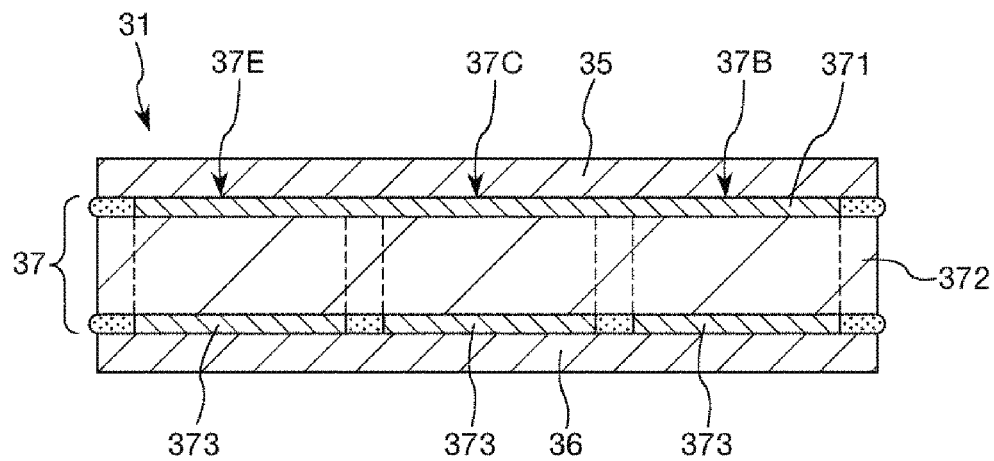
FIG. 6 is a cross-sectional view along the line C-C in FIG. 3.
Figure 7:
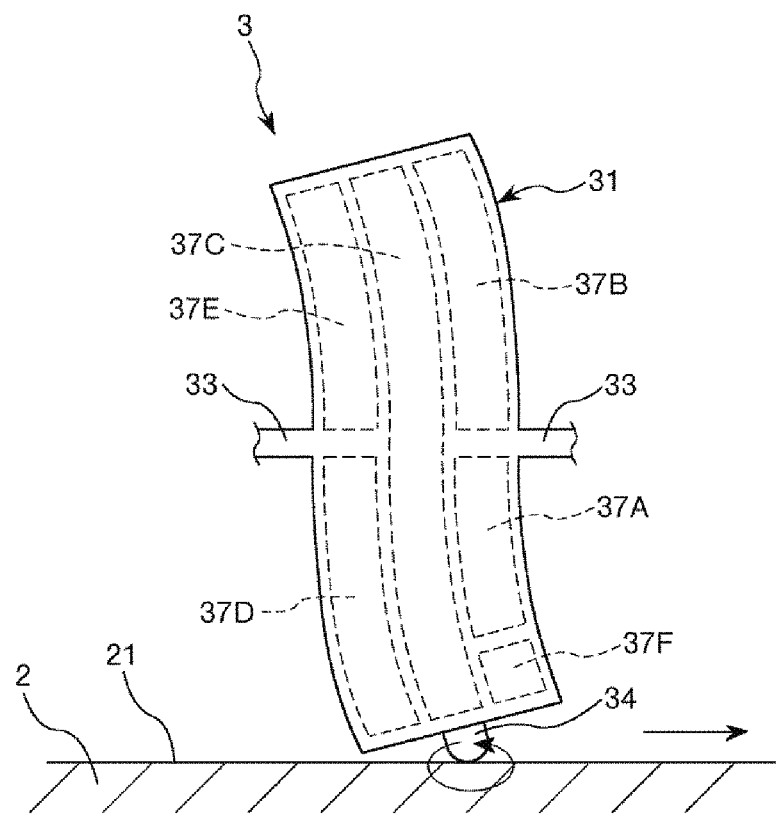
FIG. 7 is a diagram showing a vibrating state of the resonator body shown in FIG. 3.
Figure 8:
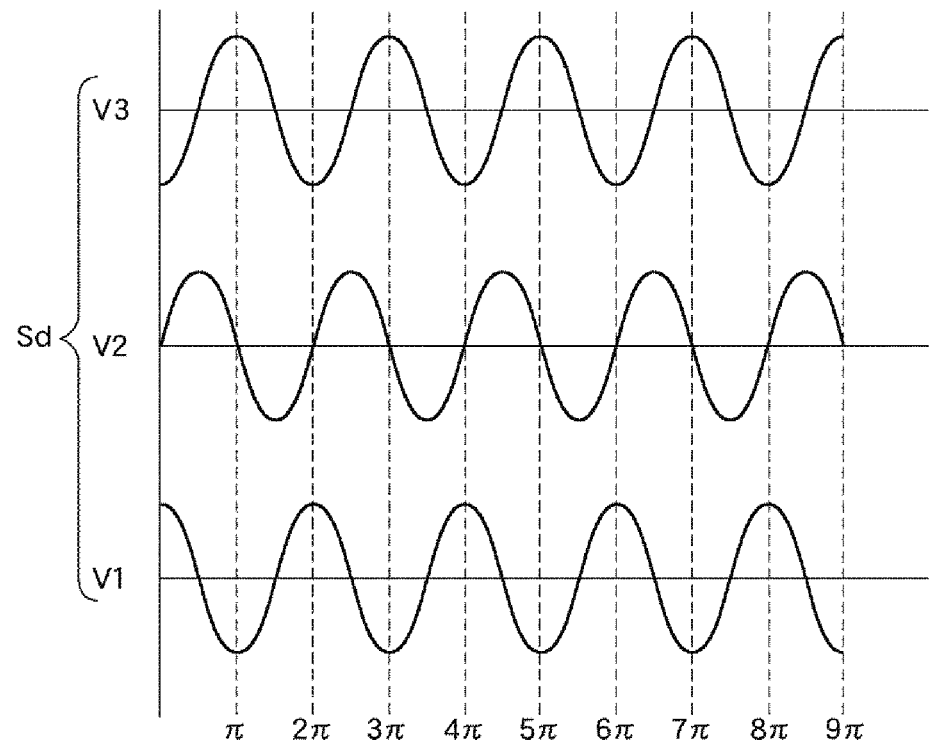
FIG. 8 is a diagram showing a drive signal to be applied to the resonator body.
Figure 9:
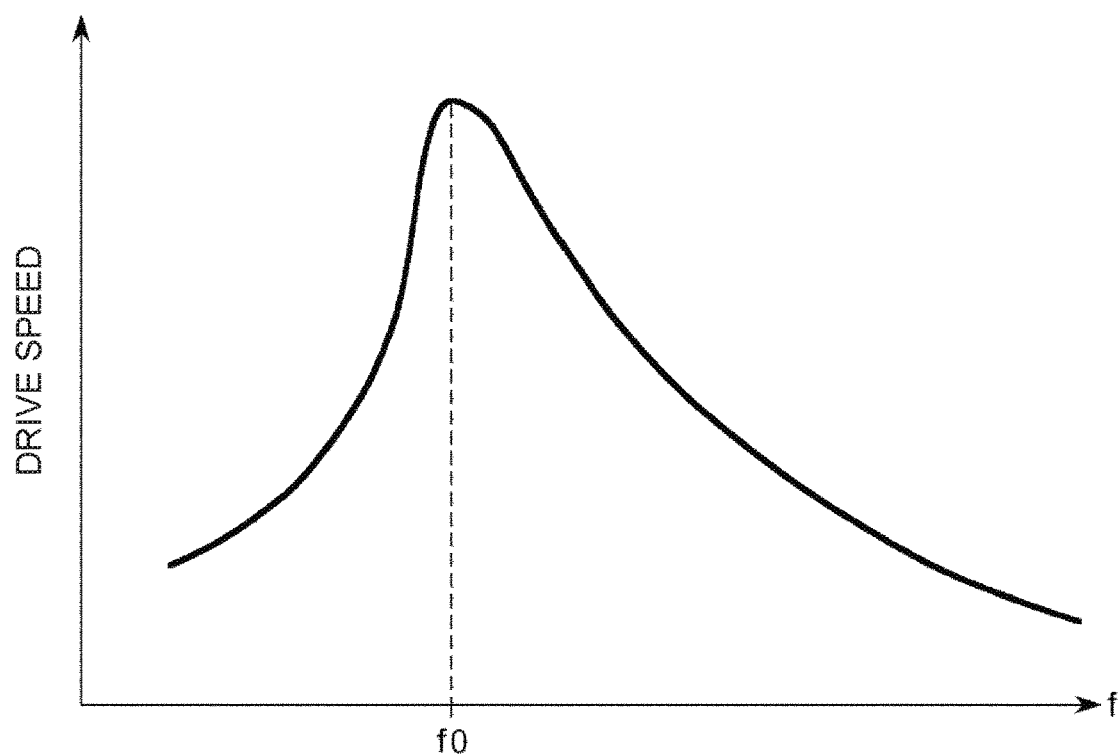
FIG. 9 is a graph showing a relationship between the frequency and the drive speed of the drive signal.
Figure 10:
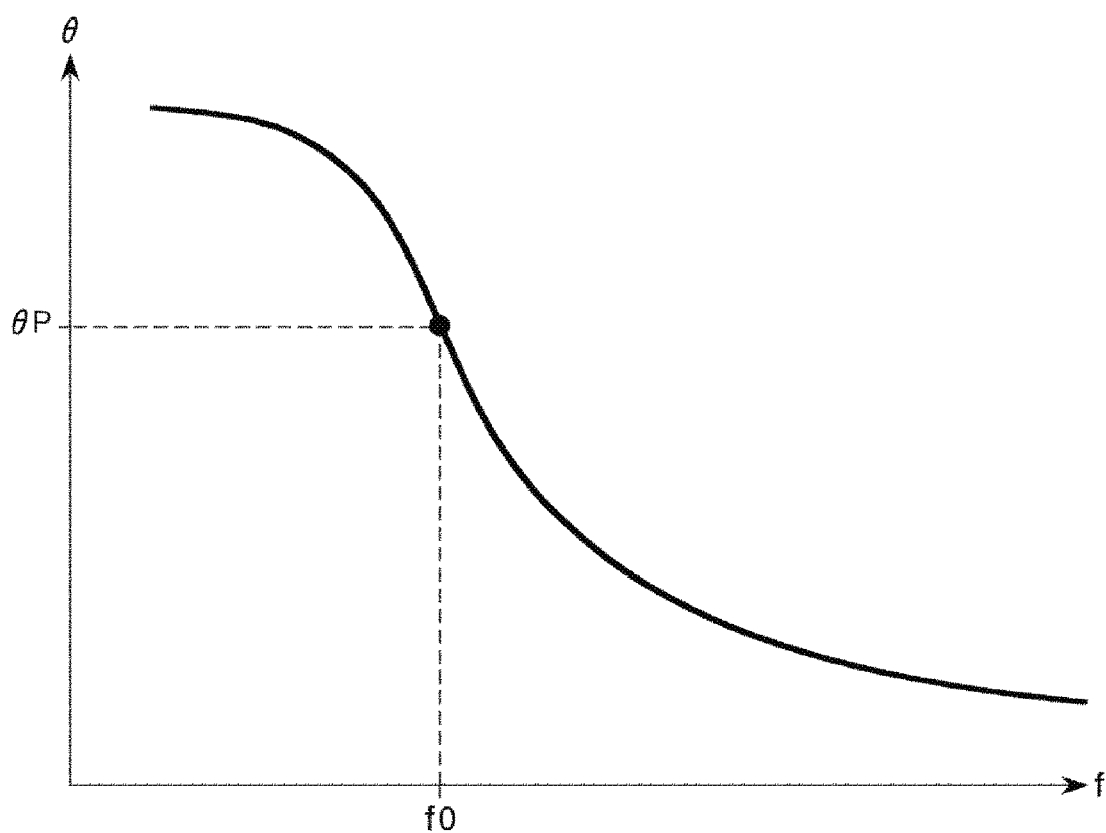
FIG. 10 is a graph showing a relationship between the frequency and the phase difference of the drive signal.
Figure 11:
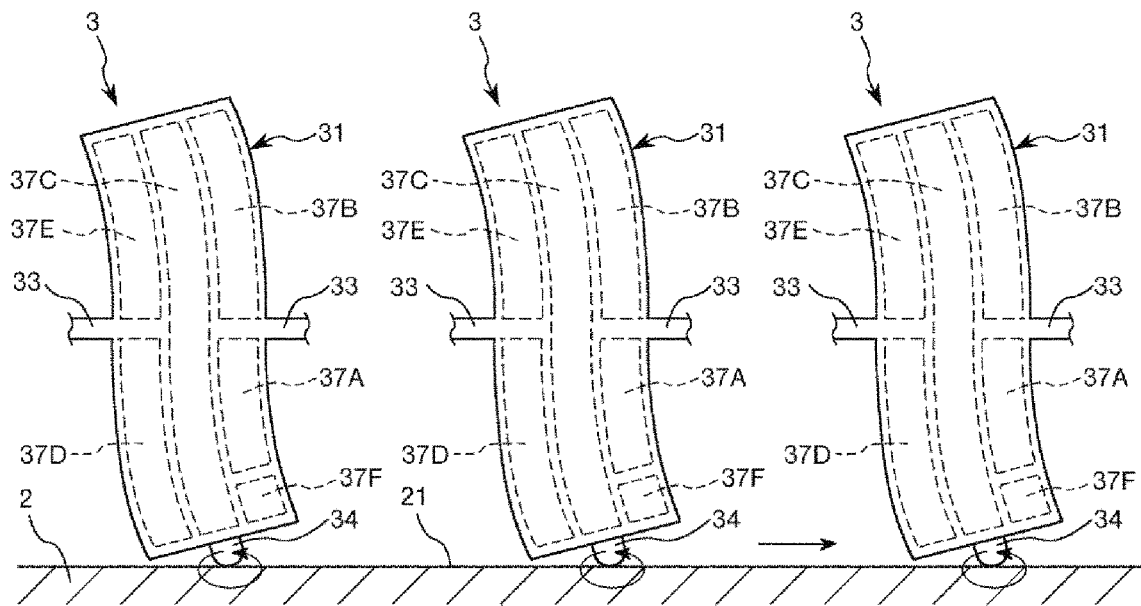
FIG. 11 is a diagram showing a vibrating state of the resonator body shown in FIG. 3.
Figure 12:
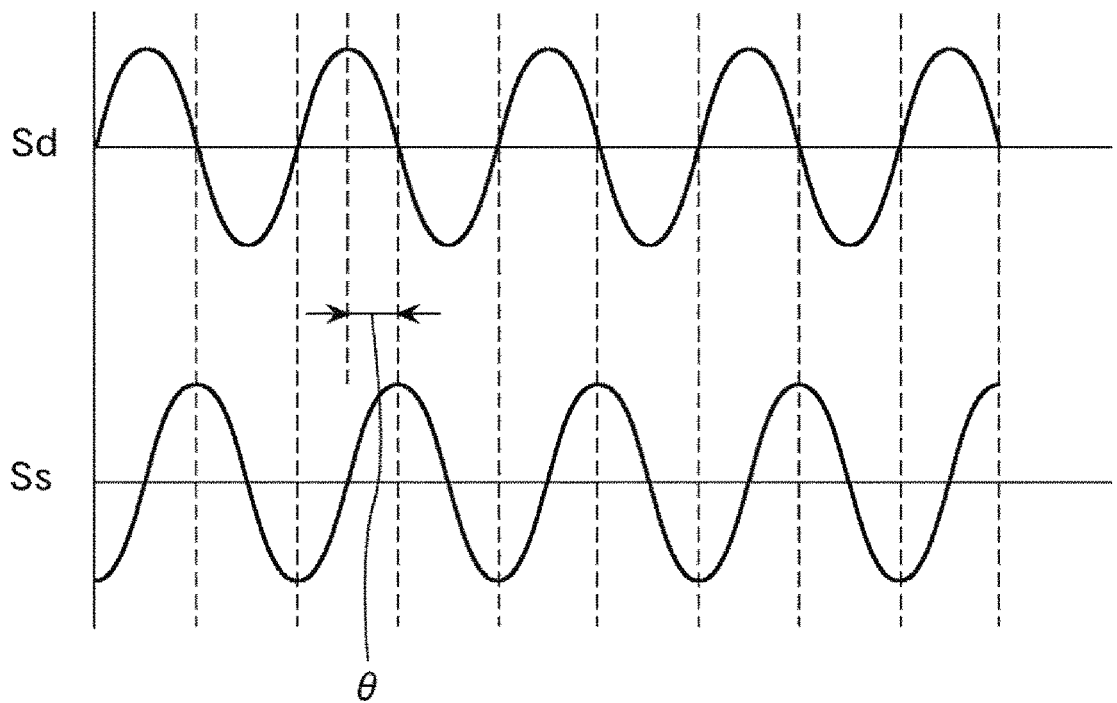
FIG. 12 is a diagram showing a phase difference between the drive signal and a detection signal.
Figure 13:
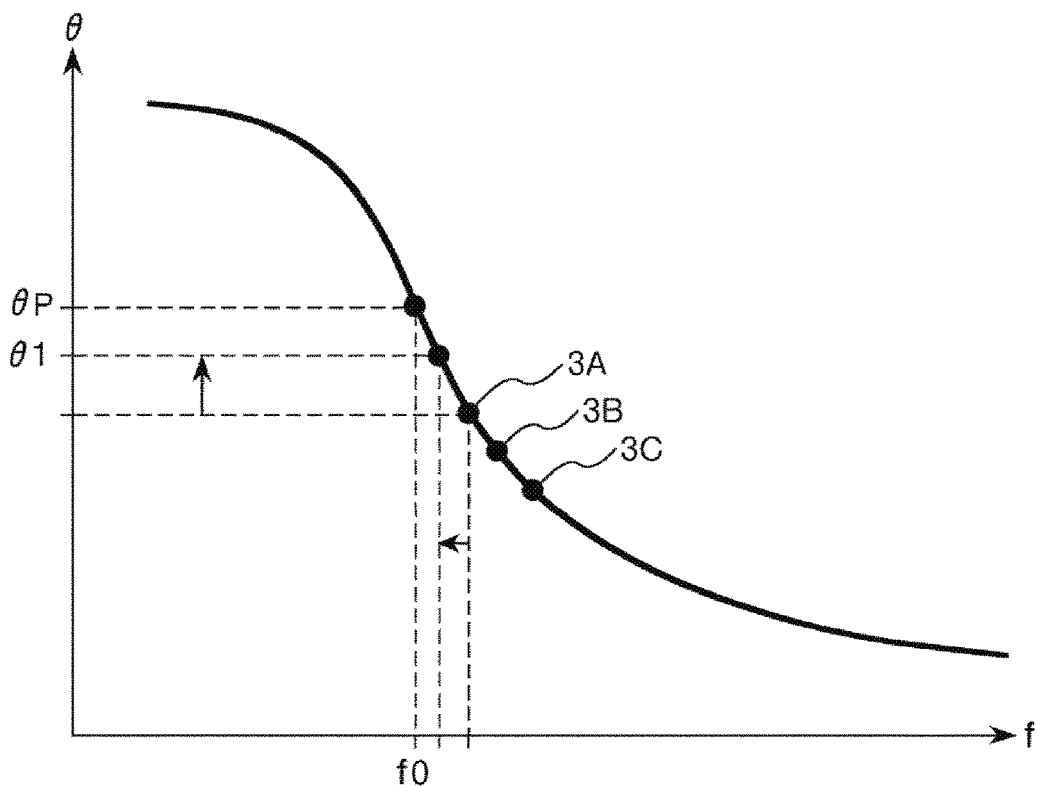
FIG. 13 is a graph for explaining a control method of a control device provided to the drive device shown in FIG. 1.
Figure 14:
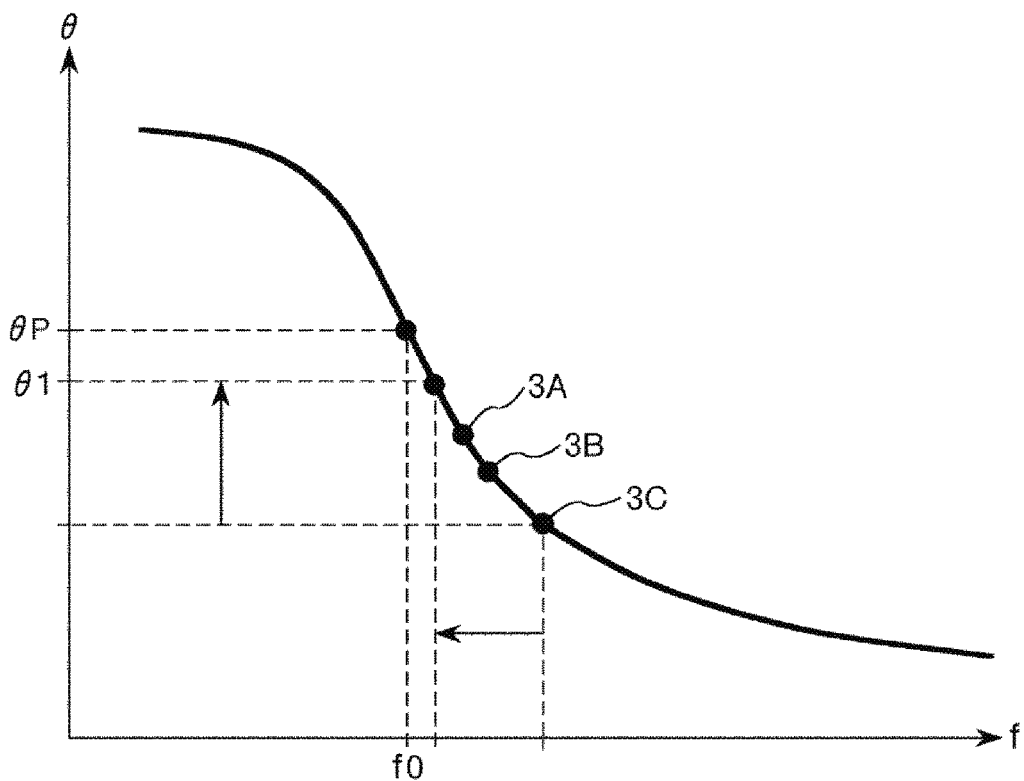
FIG. 14 is a graph for explaining the control method of the control device provided to the drive device shown in FIG. 1.
Figure 15:
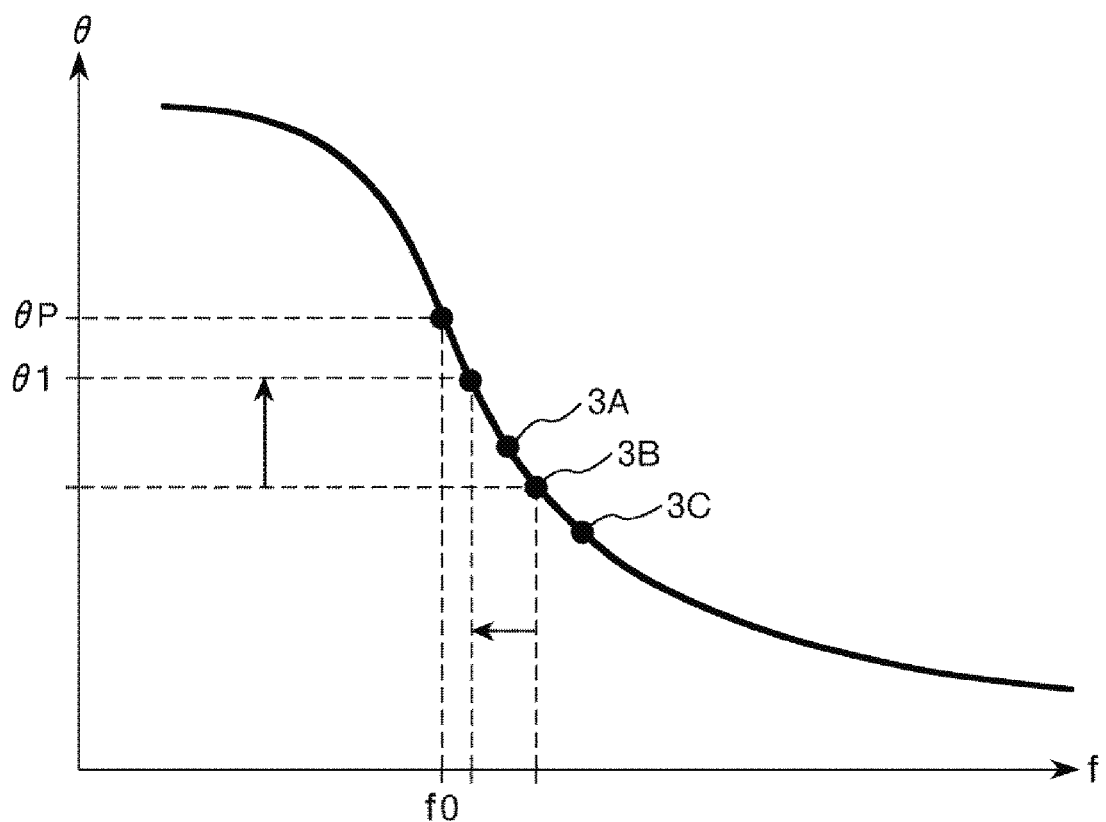
FIG. 15 is a graph for explaining the control method of the control device provided to the drive device shown in FIG. 1.

FIG. 1 is a perspective view showing the drive device according to the first embodiment of the invention. FIG. 2 is a perspective view showing a modified example of the drive device shown in FIG. 1. FIG. 3 is a plan view of each of resonator bodies provided to the drive device shown in FIG. 1. FIG. 4 is a cross-sectional view along the line A-A in FIG. 3. FIG. 5 is a cross-sectional view along the line B-B in FIG. 3. FIG. 6 is a cross-sectional view along the line C-C in FIG. 3. FIG. 7 is a diagram showing a vibrating state of the resonator body shown in FIG. 3. FIG. 8 is a diagram showing a drive signal to be applied to the resonator body. FIG. 9 is a graph showing a relationship between the frequency and the drive speed of the drive signal. FIG. 10 is a graph showing a relationship between the frequency and the phase difference of the drive signal. FIG. 11 is a diagram showing a vibrating state of the resonator body shown in FIG. 3. FIG. 12 is a diagram showing a phase difference between the drive signal and a detection signal. FIG. 13 through FIG. 15 are each a graph for explaining a control method of a control device provided to the drive device shown in FIG. 1. It should be noted that the upper side of each of FIG. 4 through FIG. 6 is also referred to as an "upper side," and the lower side thereof is also referred to as a "lower side" in the following descriptions for the sake of convenience in explanation.

The drive device 1 (the vibration device) is used as a rotary motor (an ultrasonic motor), and is provided with a rotor 2 (a driven part) rotatable around a rotational axis O, a vibration actuator 30 for rotating (driving) the rotor 2, and a control device 9 for controlling the drive of the vibration actuator 30. Further, the drive actuator 30 is provided with a plurality of resonator bodies 3, stages 4 for supporting the respective resonator bodies 3, and biasing parts 5 for respectively biasing the resonator bodies 3 toward the rotor 2 via the stages 4.

The rotor 2 has a disk-like shape, and is bearing-supported rotatably around the rotational axis O. It should be noted that the configuration of the rotor 2 is not particularly limited. Further, the plurality of resonator bodies 3 is disposed so as to have contact with an upper surface 21 of the rotor 2. It should be noted that although in the present embodiment, the three resonator bodies 3 are disposed, the number of the resonator bodies 3 is not particularly limited, but can be equal to one, two, or four, or larger than four.

It should be noted that the drive device 1 is not particularly limited, and can also have the configuration shown in FIG. 2, for example. In this case, the drive device 1 is used as a linear motor, and is provided with a slider 7 (a driven part) linearly moving due to the drive by the vibration actuator 30.

Then, although the resonator bodies 3 will be described, the three resonator bodies 3 each have substantially the same configuration, and therefore, one of the resonator bodies 3 will hereinafter be described as a representative, and the description of the rest of the resonator bodies 3 will be omitted.

As shown in FIG. 3, the resonator body 3 is provided with a vibrating part 31 which can vibrate, a support part 32 for supporting the vibrating part 31, a pair of connection parts 33 for connecting the vibrating part 31 and the support part 32, and a transmission part 34 provided to the vibrating part 31. The vibrating part 31 has a roughly rectangular plate shape, and the transmission part 34 is provided to the tip part of the vibrating part 31. Further, the support part 32 has a U shape surrounding a base end side of the vibrating part 31.

The resonator body 3 having such a configuration has contact with an upper surface 21 of the rotor 2 in the tip part of the transmission part 34, and is fixed to the stage 4 in the support part 32. Further, the stage 4 is biased by the biasing part 5 such as a spring member (a plate spring, a coil spring) toward the rotor 2 (the lower side in FIG. 3), and thus, the transmission part 34 has contact with the upper surface 21 of the rotor 2 with sufficient frictional force. Therefore, the slip is suppressed, and it is possible to efficiently transmit the vibration of the vibrating part 31 to the rotor 2 via the transmission part 34. It should be noted that in the present embodiment, one stage 4 supports one resonator body 3, but this is not a limitation, and it is also possible to support all of the resonator bodies 3 with one stage 4, for example.

Further, as shown in FIG. 1, the resonator body 3 is provided with a first substrate 35 and a second substrate disposed so as to be opposed to each other in the thickness direction. As each of the first substrate 35 and the second substrate 36, it is possible to use, for example, a silicon substrate (a semiconductor substrate). Further, the vibrating part 31 is provided with a piezoelectric element 37 disposed between the first substrate 35 and the second substrate 36, and the support section 32 is provided with a spacer 38 disposed between the first substrate 35 and the second substrate 36. It should be noted that the spacer 38 functions as a spacer for uniforming the thickness of the support part 32 to the thickness of the vibrating part 31.

As shown in FIG. 3, the piezoelectric element 37 includes five piezoelectric elements 37A, 37B, 37C, 37D, and 37E for driving, and one piezoelectric element 37F for detection. The piezoelectric elements 37A, 37B are located on one side (the right side in FIG. 3) in the width direction of the vibrating part 31, and are arranged side by side in the longitudinal direction of the vibrating part 31. The piezoelectric elements 37D, 37E are located on the other side (the left side in FIG. 3) in the width direction of the vibrating part 31, and are arranged side by side in the longitudinal direction of the vibrating part 31. The piezoelectric element 37C is located in a central part in the width direction of the vibrating part 31, and are arranged along the longitudinal direction of the vibrating part 31. The piezoelectric element 37F is located on the tip side of the piezoelectric element 37A, and is disposed on a corner part of the vibrating part 31. It should be noted that the configuration of the piezoelectric element 37 is not particularly limited providing the transmission part 34 can be vibrated in a rotational vibration described above. For example, the piezoelectric element 37C can also be omitted. Further, the arrangement of the piezoelectric element 37F is not particularly limited providing the detection signal corresponding to the vibration (deformation) of the vibrating part 31 can be obtained.

Further, as shown in FIG. 4 through FIG. 6, the piezoelectric element 37 is provided with a piezoelectric body 372, a first electrode 371 disposed on an upper surface of the piezoelectric body 372, and second electrodes 373 disposed on a lower surface of the piezoelectric body 372.

The first electrode 371 is a common electrode disposed commonly to the piezoelectric elements 37A, 37B, 37C, 37D, 37E, and 37F. In contrast, the second electrodes 373 are individual electrodes individually disposed for the respective piezoelectric elements 37A, 37B, 37C, 37D, 37E, and 37F. Further, the piezoelectric body 372 is integrally disposed commonly to the piezoelectric elements 37A, 37B, 37C, 37D, 37E, and 37F. It should be noted that the piezoelectric body 372 can also be individually disposed for each of the piezoelectric elements 37A, 37B, 37C, 37D, 37E, and 37F.

By applying an electrical field in a direction parallel to the thickness direction of the vibrating part 31 to the piezoelectric body 372, the piezoelectric body 372 extends and contracts in the longitudinal direction of the vibrating part 31. Further, in the piezoelectric body 372, by the vibrating part 31 extending or contracting (deforming) in the longitudinal direction, the electrical field in a direction parallel to the thickness direction of the vibrating part 31 occurs. As the constituent material of such a piezoelectric body 372, there can be used piezoelectric ceramics such as lead zirconium titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, or lead scandium niobate. The piezoelectric body 372 formed of the piezoelectric ceramics can be formed from, for example, a bulk material, or can also be formed using a sol-gel method, or a sputtering method. It should be noted that as the constituent material of the piezoelectric body 372, there can be used polyvinylidene fluoride, quartz crystal, and so on besides the piezoelectric ceramics described above.

As shown in FIG. 7, it is possible for the resonator body 3 having a configuration described above to rotationally vibrate (elliptically vibrate) the transmission section 34. In order to achieve such a vibration, it is sufficient to apply a drive signal Sd having a voltage periodically varying to the piezoelectric element 37, for example, as shown in FIG. 8. Specifically, it is sufficient to apply the voltage V1 shown in FIG. 8 to the piezoelectric elements 37A, 37E, apply the voltage V2 to the piezoelectric element 37C, and apply the voltage V3 to the piezoelectric elements 37B, 37D. It should be noted that the voltages V1, V2, and V3 are the same in frequency and amplitude as each other but are different in phase from each other. Thus, the vibrating part 31 makes a lateral vibration in which the vibrating part 31 makes a quadratic flexural action in the width direction while making a longitudinal vibration in which the vibrating part 31 extending and contracting in the longitudinal direction. Such a longitudinal vibration and such a lateral vibration are combined with each other, and the vibrating part 31 makes a flexural vibration in a sigmoid manner, and due to the vibration, the transmission part 34 makes the rotational vibration (the elliptical vibration) which is the complex vibration of the longitudinal vibration and the lateral vibration. It should be noted that the voltage patterns to be applied to the piezoelectric elements 37 are not particularly limited providing it is possible to rotationally vibrate the transmission part 34.

In contrast, when the resonator body 3 vibrates in such a manner as described above, the piezoelectric element 37F is deflected, and due to the reflection, the charge generated from the piezoelectric body 372 is output from the piezoelectric element 37F (between the first electrode 371 and the second electrode 373F) as a detection signal Ss (an alternating voltage periodically varying in voltage value). Therefore, by using this detection signal, it is possible to accurately detect the vibration of the resonator body 3. It should be noted that the frequency of the detection signal Ss becomes roughly equal to the frequency of the drive signal Sd.

Here, the drive signal Sd will be described. FIG. 9 is a graph showing a relationship between the frequency f of the drive signal Sd and the drive speed (drive speed of the rotor 2) of the vibration actuator 30. As shown in FIG. 9, by making the frequency f of the drive signal Sd approximate to the resonance frequency f0 of the resonator body 3, it is possible to increase the dive speed, and by making the frequency f away from the resonance frequency f0, it is possible to decrease the drive speed. Further, achieving a peak at resonance frequency f0, the drive speed gently decreases on the high-frequency side of the resonance frequency f0, and on the contrary, the drive speed rapidly decreases on the low-frequency side of the resonance frequency f0. Therefore, the frequency f of the drive signal Sd is set higher than the resonance frequency f0. Thus, the variation of the drive speed with respect to the frequency variation of the drive signal Sd decreases compared to the case in which the frequency f of the drive signal Sd is lower than the resonance frequency f0, and thus, it is possible to accurately control the drive speed. It should be noted that the drive signal Sd can also be lower in frequency than the resonance frequency f0.

Then, the phase difference θ between the drive signal Sd and the detection signal Ss will be described. FIG. 10 is a graph showing a relationship between the frequency f and the phase difference θ of the drive signal Sd. As shown in FIG. 10, the phase difference θ increases monotonically as the frequency f of the first drive signal Sd1 lowers. It should be noted that in FIG. 10, the phase difference corresponding to the resonance frequency f0 is denoted by θp.

Hereinabove, the resonator bodies 3 are described, but the configuration of the resonator bodies 3 is not particularly limited. For example, the support part 32 and the connection parts 33 can also be omitted. Further, it is also possible to omit either one of the first substrate 35 and the second substrate 36.

Then, a method of controlling the vibration actuator 30 by the control device 9 will be described. It should be noted that the control method is not limited to the method described hereinafter. As shown in FIG. 1, the control device 9 (a processor) is provided with a detection signal acquisition section 91 for obtaining the detection signal Ss from each of the resonator bodies 3, a phase difference detection section 92 for detecting the phase difference θ of each of the resonator bodies 3, a resonator body selection section 93 for selecting one from the plurality of resonator bodies 3, and a drive signal control section 94 for changing the frequency f of the drive signal Sd so that the phase difference θ of the resonator body 3 thus selected is within a predetermined range.

As shown in FIG. 11, when the drive signal control section 94 applies the drive signal Sd to each of the resonator bodies 3, the transmission part 34 of each of the resonator bodies 3 rotationally vibrates (elliptically vibrates), and the rotor 2 rotates. It should be noted that the drive signal control section 94 applies the common drive signal Sd the same in frequency, amplitude, phase and so on to the resonator bodies 3. Further, as shown in FIG. 12, the detection signal Ss corresponding to the rotational vibration (the elliptical vibration) is output from each of the resonator bodies 3. The detection signals Ss of the respective resonator bodies 3 are obtained by the detection signal acquisition section 91. Then, the phase difference detection section 92 detects the phase difference θ between the drive signal Sd and the detection signal Ss of each of the resonator bodies 3 based on the detection signal Ss from each of the resonator bodies 3 obtained by the detection signal acquisition section 91. Here, the phase difference detection section 92 is arranged to select either one of the three voltages V1, V2, and V3 included in the drive signal Sd to detect the phase difference θ between the selected voltage and the detection signal Ss.

If the resonator bodies 3 are driven with the same drive signal Sd, the phase differences θ thus detected are different from each other due to an individual difference in some cases. Therefore, the control device 9 is arranged to select one from the plurality of resonator bodies 3 to adjust (vary) the frequency f of the drive signal Sd so that the phase difference θ in the resonator body 3 thus selected comes closer to a target value θ1.

As an example, the resonator body selection section 93 selects one the largest in phase difference θ from the plurality of (all of the) resonator bodies 3. Then, the drive signal control section 94 adjusts the frequency f of the drive signal Sd so that the phase difference θ in the resonator body 3 selected by the resonator body selection section 93 comes closer to the target value θ1. It should be noted that hereinafter, the control method described above is also referred to as a "first control method."

Citing a specific example, as shown in FIG. 13, the target value θ1 of the phase difference θ is set in the drive signal control section 94. The target value θ1 is set to a value close to the phase difference θp and existing on the side (within a high range) where the frequency f is higher than the resonance frequency f0. As described above, by setting the target value θ1 on the side where the frequency f is higher than the resonance frequency f0, it becomes easy to tune the phase difference θ to the target value θ1 since the variation of the phase difference θ with respect to the variation of the frequency f is gentle as described above. Further, the reason that the target value θ1 is slightly shifted toward the high-frequency side with respect to the phase difference θp is as follows. By tuning the phase difference θ to the phase difference θp, it is possible to vibrate the resonator body 3 with the highest efficiency, and from this viewpoint, it is preferable to set the target value θ1 to the phase difference θp. However, since the variation of the phase difference θ with respect to the variation of the frequency f is relatively large around the phase difference θp, if the target value θ1 is set to the phase difference θp, it becomes difficult to tune the phase difference θ to the target value θ1. In contrast, by slightly shifting the target value θ1 toward the high-frequency side with respect to the phase difference θp, the variation of the phase difference θ with respect to the variation of the frequency f around the target value θ1 becomes smaller compared to that around the phase difference θp. Therefore, it becomes easy to tune the phase difference θ to the target value θ1.

Further, the target value θ1 is set in a range in which the phase difference θ changes monotonically with respect to the frequency f. In particular in the present embodiment, the target value θ1 is set in a range in which the phase difference θ monotonically increases as the frequency f is shifted from the high-frequency side toward the low-frequency side. It should be noted that the range of monotonic increase described above denotes the range in which the phase difference θ always increases when the frequency f is shifted from the high-frequency side toward the low-frequency side in the specification of the present patent application. Thus, by shifting the frequency f from the high-frequency side toward the low-frequency side, it becomes easy to tune the phase difference θ to the target value θ1. It should be noted that in the case of tuning the phase difference θ to the target value θ1, it is preferable to shift the frequency f from the high-frequency side toward the low-frequency side. Since the variation of the phase difference θ with respect to the variation of the frequency f is smaller on the high-frequency side than that on the low-frequency side as is understood from FIG. 13, by shifting the frequency f from the high-frequency side toward the low-frequency side, it becomes easier to tune the phase difference θ to the target value θ1 compared to the case of shifting the frequency in the opposite direction.

In the case shown in FIG. 13, since the resonator body 3A is the largest in phase difference θ of the three resonator bodies 3 (3A, 3B, and 3C), the resonator body selection section 93 selects the resonator body 3A from the three resonator bodies 3A, 3B, and 3C. Then, the drive signal control section 94 shifts the frequency f of the drive signal Sd from the high-frequency side toward the low-frequency side to make the phase difference θ of the resonator body 3A come closer to the target value θ1, or preferably coincide with the target value θ1.

Thus, it is possible for at least the resonator body 3A out of the three resonator bodies 3A, 3B, and 3C to exert the desired vibration characteristics. Further, regarding the other resonator bodies, namely the resonator bodies 3B, 3C, it is also possible to make the phase difference θ come closer to the target value θ1. Therefore, it is possible to efficiently vibrate the plurality of resonator bodies 3 as a whole, and thus, the drive characteristics of the vibration actuator 30 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3A, 3B, and 3C, and thus, the robustness is improved. Further, by selecting the resonator body 3A the largest in phase difference θ, it is possible to prevent the phase differences θ in the other resonator bodies, namely the resonator bodies 3A, 3B, from being shifted toward the low-frequency side beyond the phase difference θp. Therefore, the stable drive of all of the resonator bodies 3 becomes possible. Moreover, it is also possible to set the target value θ1 in the vicinity of the phase difference θp, and it is possible to more efficiently vibrate each of the resonator bodies 3.

It should be noted that there is conceivable the case in which another of the resonator bodies 3 (i.e., the resonator body 3B or the resonator body 3C) becomes the largest in phase difference θ in the process of shifting the frequency f in order to make the phase difference θ of the resonator body 3A come closer to the target value θ1. Therefore, it is preferable for the resonator body selection section 93 to always or periodically compare the phase differences θ of the three resonator bodies 3A, 3B, and 3C to each other to reselect the resonator body 3 the largest in phase difference θ in each case. Thus, more stable drive of the drive device 1 becomes possible.

The case (the first control method) in which the resonator body selection section 93 selects the resonator body 3 the largest in phase difference θ is hereinabove described, but the resonator body 3 selected by the resonator body selection section 93 is not limited thereto. As another example, it is also possible for the resonator body selection section 93 to select the resonator body 3 the smallest in phase difference θ. Then, the drive signal control section 94 changes the frequency f of the drive signal Sd so that the phase difference θ in the resonator body 3 selected by the resonator body selection section 93 comes closer to the target value θ1. It should be noted that hereinafter, the control method described above is also referred to as a "second control method."

Citing a specific example, as shown in FIG. 14, the target value θ1 of the phase difference θ is set in the drive signal control section 94. The target value θ1 is set to a value close to the phase difference θp and existing on the side in which the frequency f is higher than the resonance frequency f0 similarly to the first control method described above. In the case shown in FIG. 14, since the resonator body 3C is the smallest in phase difference θ of the three resonator bodies 3A, 3B, and 3C, the resonator body selection section 93 selects the resonator body 3C from the three resonator bodies 3A, 3B, and 3C. Then, the drive signal control section 94 shifts the frequency f of the drive signal Sd from the high-frequency side toward the low-frequency side to make the phase difference θ of the resonator body 3C come closer to the target value θ1, or preferably coincide with the target value θ1.

Thus, it is possible for at least the resonator body 3C out of the three resonator bodies 3A, 3B, and 3C to exert the desired vibration characteristics. Further, regarding the other resonator bodies, namely the resonator bodies 3A, 3B, it is also possible to make the phase difference θ come closer to the target value θ1. Therefore, it is possible to efficiently vibrate the plurality of resonator bodies 3 as a whole, and thus, the drive characteristics of the vibration actuator 30 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3A, 3B, and 3C, and thus, the robustness is improved.

Here, in the case in which the resonator body selection section 93 selects the resonator body 3C the smallest in phase difference θ, if the target value θ1 is set in the vicinity of the phase difference θp, there is a possibility that the phase difference θ in the other resonator bodies, namely the resonator bodies 3A, 3B, are shifted toward the low-frequency side of the phase difference θp. Therefore, in the case in which the resonator body selection section 93 selects the resonator body 3C the smallest in phase difference θ, it is preferable to set the target value θ1 so as to be shifted, for example, toward the high-frequency side compared to the target value θ1 in the first control method described above. Thus, the possibility that the phase difference θ of the other resonator bodies, namely the resonator bodies 3A, 3B, are shifted toward the low-frequency side of the phase difference θp is reduced. By setting the target value θ1 so as to be shifted, for example, toward the high-frequency side compared to the target value θ1 in the first control method described above as described above, the variation of the phase difference θ with respect to the variation of the frequency f decreases in the vicinity of the target value θ1, and therefore, it becomes easy to tune the phase difference θ to the target value θ1 compared to the first control method described above.

It should be noted that there is conceivable the case in which another of the resonator bodies 3 (i.e., the resonator body 3A or the resonator body 3B) becomes the smallest in phase difference θ in the process of shifting the frequency f in order to tune the phase difference θ of the resonator body 3C to the target value θ1. Therefore, it is preferable for the resonator body selection section 93 to always or periodically compare the phase differences θ of the three resonator bodies 3A, 3B, and 3C to each other to reselect the resonator body 3 the smallest in phase difference θ in each case. Thus, efficient and stable drive of the vibration actuator 30 becomes possible.

The case (the second control method) in which the resonator body selection section 93 selects the resonator body 3 the smallest in phase difference θ is hereinabove described, but the resonator body 3 selected by the resonator body selection section 93 is not limited thereto. As another example, in the case in which the number of the resonator bodies 3 is three or more, it is possible for the resonator body selection section 93 to select one from the resonator bodies 3 except one with the largest phase difference θ and one with the smallest phase difference θ. Then, the drive signal control section 94 changes the frequency f of the drive signal Sd so that the phase difference θ in the resonator body 3 selected by the resonator body selection section 93 comes closer to the target value θ1. It should be noted that hereinafter, the control method described above is also referred to as a "third control method."

Citing a specific example, as shown in FIG. 15, the target value θ1 of the phase difference θ is set in the drive signal control section 94. The target value θ1 is set to a value close to the phase difference θp and existing on the side in which the frequency f is higher than the resonance frequency f0 similarly to the first control method described above. In the case shown in FIG. 15, since the resonator body 3A is the largest in phase difference θ and the resonator body 3C is the smallest in phase difference θ of the three resonator bodies 3A, 3B, and 3C, the resonator body selection section 93 selects the other resonator body, namely the resonator body 3B. Then, the drive signal control section 94 shifts the frequency f of the drive signal Sd from the high-frequency side toward the low-frequency side to make the phase difference θ of the resonator body 3B come closer to the target value θ1, or preferably coincide with the target value θ1.

Thus, it is possible for at least the resonator body 3B out of the three resonator bodies 3A, 3B, and 3C to exert the desired vibration characteristics. Further, regarding the other resonator bodies, namely the resonator bodies 3A, 3C, it is also possible to make the phase difference θ come closer to the target value θ1. Therefore, it is possible to efficiently vibrate the plurality of resonator bodies 3 as a whole, and thus, the drive characteristics of the vibration actuator 30 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3A, 3B, and 3C, and thus, the robustness is improved.

Here, in the case of selecting the resonator body 3B, if the target value θ1 is set in the vicinity of the phase difference θp, there is a possibility that the phase difference θ in the resonator body 3A is shifted toward the low-frequency side of the phase difference θp. Therefore, in the case in which the resonator body selection section 93 selects the resonator body 3B, it is preferable to set the target value θ1 so as to be shifted, for example, toward the high-frequency side compared to the target value θ1 in the first control method described above. Thus, the possibility that the phase difference θ of the resonator body 3A is shifted toward the low-frequency side of the phase difference θp is reduced. It should be noted that the shift amount of the target value θ1 in the present embodiment with respect to the target value θ1 in the first control method can be suppressed to a smaller value compared to that in the second control method described above.

It should be noted that there is conceivable the case in which the phase difference θ in another of the resonator bodies 3 (i.e., the resonator body 3A or the resonator body 3C) becomes the intermediate value in the process of shifting the frequency f in order to tune the phase difference θ of the resonator body 3B to the target value θ1. Therefore, it is preferable for the resonator body selection section 93 to always or periodically compare the phase differences θ of the three resonator bodies 3A, 3B, and 3C to each other to reselect the resonator body 3 which is not the largest nor the smallest in phase difference θ in each case. Thus, efficient and stable drive of the vibration actuator 30 becomes possible.

The method of controlling the vibration actuator 30 by the control device 9 is hereinabove described. Such a control device 9 is the control device for the vibration actuator 30, having the rotor 2 (the driven body), and the plurality of resonator bodies 3 each having the transmission part 34 (a contact part) having contact with the rotor 2, and applying the common and alternating-current drive signal Sd to the plurality of resonator bodies 3 to thereby cause the rotational vibration in the transmission parts 34 of the respective resonator bodies 3, then transmit the rotational vibration of the plurality of resonator bodies 3 to cause the rotor 2 to make a relative displacement. Further, the control device 9 is provided with the detection signal acquisition section 91 for obtaining the alternative-current detection signal Ss corresponding to the vibration of the resonator 3 from each of the resonator bodies 3, the phase difference detection section 92 for detecting the phase difference θ between the drive signal Sd and the detection signal Ss with respect to each of the resonator bodies 3, the resonator body selection section 93 for selecting one from the resonator bodies 3, and the drive signal control section 94 for adjusting the frequency f of the drive signal Sd so that the phase difference θ of the resonator body 3 thus selected comes closer to the target value θ1. Thus, it is possible for at least the resonator body 3 selected by the resonator body selection section 93 out of the plurality of resonator bodies 3 to exert the desired vibration characteristics. Further, regarding the other resonator bodies 3, it is also possible to make the phase difference θ come closer to the target value θ1. Therefore, it is possible to efficiently vibrate the plurality of resonator bodies 3 as a whole, and thus, the drive characteristics of the vibration actuator 30 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3, and thus, the robustness is improved.

Further, the method of controlling the vibration actuator 30 is a method of controlling the vibration actuator 30 having the rotor 2 (the driven body), and the plurality of resonator bodies 3 each having the transmission part 34 (the contact part) having contact with the rotor 2, and applying the common and alternating-current drive signal Sd to the plurality of resonator bodies 3 to thereby cause the rotational vibration in the transmission parts 34 of the respective resonator bodies 3, then transmit the rotational vibration of the plurality of resonator bodies 3 to cause the rotor 2 to make a relative displacement. Further, in this control method, the alternative-current detection signal Ss corresponding to the vibration of the resonator 3 is obtained from each of the resonator bodies 3, the phase difference θ between the drive signal Sd and the detection signal Ss is detected with respect to each of the resonator bodies 3, one of the resonator bodies 3 is selected, and the frequency f of the drive signal Sd is adjusted so that the phase difference θ of the resonator body 3 thus selected comes closer to the target value θ1. Thus, it is possible for at least the resonator body 3 selected by the resonator body selection section 93 out of the plurality of resonator bodies 3 to exert the desired vibration characteristics. Therefore, it is possible to efficiently vibrate the plurality of resonator bodies 3 as a whole, and thus, the drive characteristics of the vibration actuator 30 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3, and thus, the robustness is improved.

Further, the drive device 1 as the vibration device is provided with the rotor 2 (the driven body), the plurality of resonator bodies 3 each having the transmission part 34 (the contact part) having contact with the rotor 2, and the control device 9 as a processor, and is arranged to apply the common and alternating-current drive signal Sd to the plurality of resonator bodies 3 to thereby cause the rotational vibration in the transmission parts 34 of the respective resonator bodies 3, then transmit the rotational vibration of the plurality of resonator bodies 3 to cause the rotor 2 to make a relative displacement. Further, the control device 9 obtains the alternative-current detection signal Ss corresponding to the vibration of the resonator 3 from each of the resonator bodies 3, detects the phase difference θ between the drive signal Sd and the detection signal Ss with respect to each of the resonator bodies 3, selects one from the plurality of resonator bodies 3, and then adjusts the frequency of the drive signal Sd so that the phase difference θ of the resonator body 3 thus selected comes closer to the target value θ1. Thus, it is possible for at least the resonator body 3 selected by the control device 9 out of the plurality of resonator bodies 3 to exert the desired vibration characteristics. Therefore, it is possible to efficiently vibrate the plurality of resonator bodies 3 as a whole, and thus, the drive characteristics of the drive device 1 are improved. Further, such control is the control based on the phase difference θ of selected one of the resonator bodies 3, and is therefore hard to be affected by the individual differences (e.g., an individual difference between the resonator bodies 3 themselves, and a difference in pressing force against the rotor 2) between the resonator bodies 3, and thus, the robustness is improved.

Further, as described above, in the control device 9, the drive signal control section 94 adjusts the frequency f of the drive signal Sd within a range higher than the resonance frequency f0 of the resonator body 3. Thus, the variation of the drive speed of the vibration actuator 30 with respect to the frequency variation of the drive signal Sd can be made smaller compared to the case of adjusting the frequency f of the drive signal Sd within a range lower than the resonance frequency f0. Therefore, it is possible to accurately control the drive speed of the vibration actuator 30.

Further, as described above, in the control device 9, the target value θ1 is set on the high-frequency side with respect to the resonance frequency f0 in the relationship between the phase difference θ and the frequency f of the drive signal Sd. Thus, it is possible to make the variation of the phase difference θ with respect to the frequency variation of the drive signal Sd smaller compared to the case in which the target value θ1 is set on the low-frequency side of the drive signal Sd with respect to the peak θp. Therefore, it is possible to more accurately tune the phase difference θ of the resonator body 3 thus selected to the target value θ1.

Further, as described above, in the control device 9, it is possible for the resonator body selection section to select the resonator body 3 the largest in phase difference θ from the plurality of resonator bodies 3. Thus, the selection of the resonator body 3 by the resonator body selection section 93 becomes easy. Further, it is possible to prevent the phase difference θ of the resonator body 3 other than the resonator body 3 thus selected from being shifted toward the low-frequency side of the peak θp. Therefore, the stable drive of all of the resonator bodies 3 becomes possible. Moreover, it is also possible to set the target value θ1 in the vicinity of the peak θp, and it is possible to more efficiently vibrate each of the resonator bodies 3.

Further, as described above, in the control device 9, it is possible for the resonator body selection section 93 to select the resonator body 3 the smallest in phase difference θ from the plurality of resonator bodies 3. Thus, the selection of the resonator body 3 by the resonator body selection section 93 becomes easy. Further, for example, since the variation of the phase difference θ with respect to the variation of the frequency f becomes gentle in the vicinity of the target value θ1, it becomes easy to tune the phase difference θ of the resonator body 3 thus selected to the target value θ1.

Second Embodiment

Then, a vibration device according to a second embodiment of the invention will be described.

Figure 16:
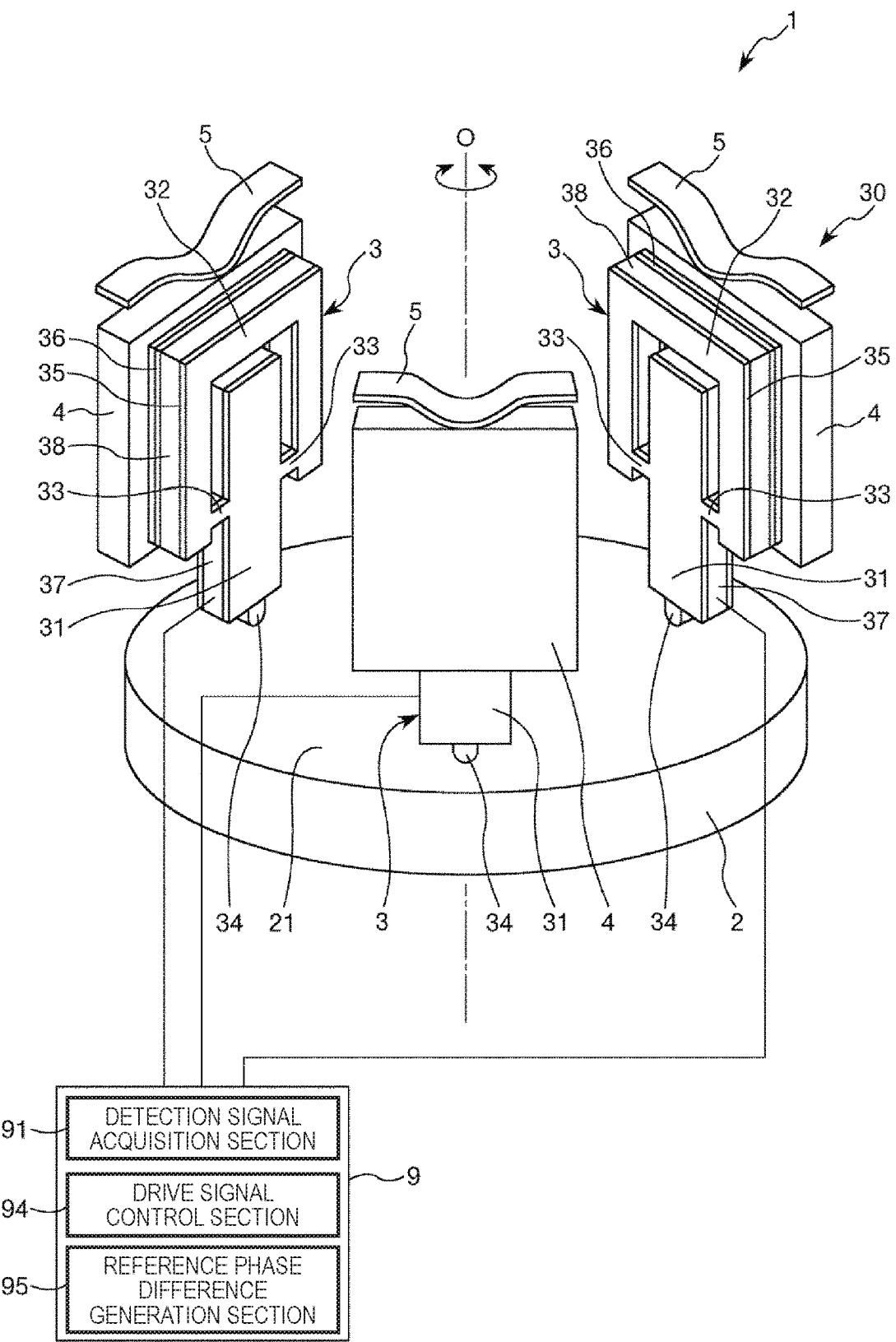
FIG. 16 is a perspective view showing a drive device according to a second embodiment of the invention.
Figure 17:
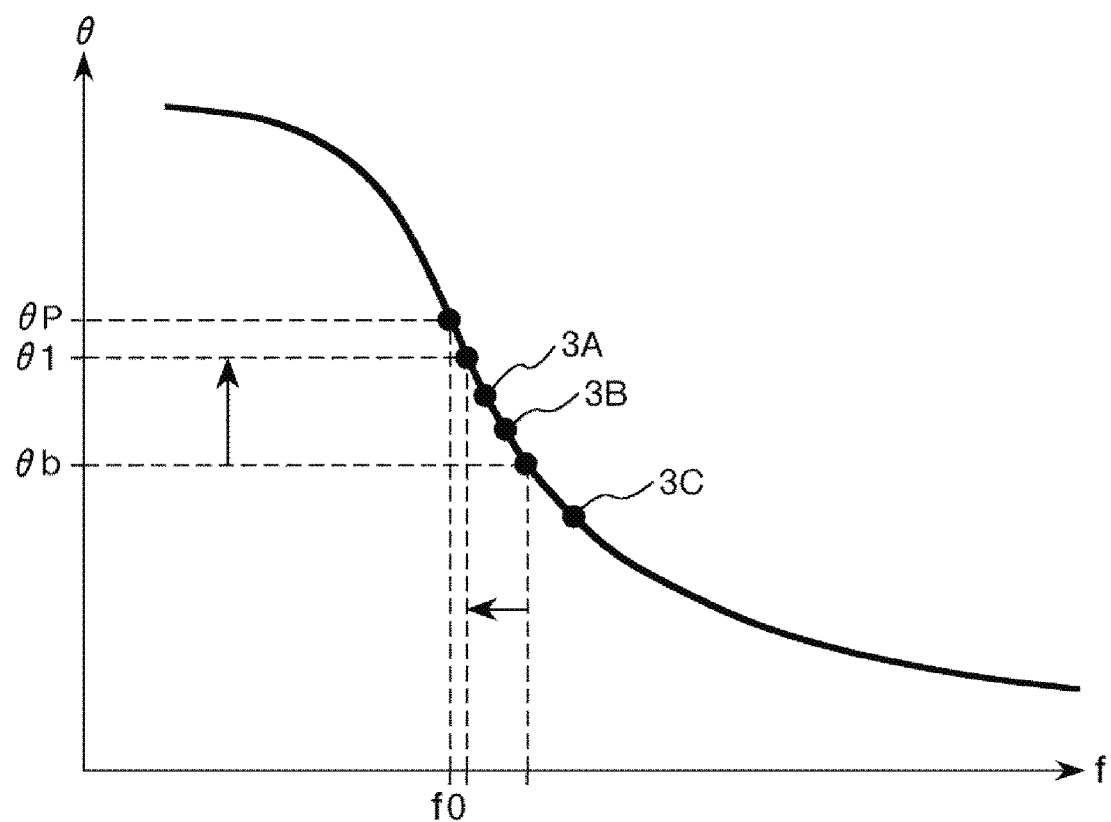
FIG. 17 is a graph for explaining a control method of a control device provided to the drive device shown in FIG. 16.

FIG. 16 is a perspective view showing a drive device according to the second embodiment of the invention. FIG. 17 is a graph for describing a control method of a control device provided to the drive device shown in FIG. 16.

The drive device of the second embodiment will hereinafter be described focusing mainly on the differences from the embodiment described above, and the description of substantially the same matters will be omitted.

The drive device 1 according to the second embodiment of the invention is substantially the same as that of the first embodiment described above except the point that the configuration of the control device 9 and the control method by the control device 9 are different therefrom. It should be noted that the constituents substantially the same as those of the embodiment described above are denoted by the same reference symbols.

As shown in FIG. 16, the control device 9 of the present embodiment is provided with the detection signal acquisition section 91 for obtaining the detection signal Ss from each of the resonator bodies 3, a reference phase difference generation section 95 for generating a reference phase difference θb, and the drive signal control section 94 for adjusting the frequency f of the drive signal Sd so that the reference phase difference θb comes closer to the target value θ1.

Similarly to the first embodiment described above, when the drive signal control section 94 applies the drive signal Sd to each of the resonator bodies 3, the transmission part 34 of each of the resonator bodies 3 rotationally vibrates (elliptically vibrates), and the rotor 2 rotates. It should be noted that the drive signal control section 94 applies the common drive signal Sd the same in frequency, amplitude, phase and so on to the resonator bodies 3. Further, the detection signal Ss corresponding to the rotational vibration (the elliptical vibration) is output from each of the resonator bodies 3. The detection signals Ss of the respective resonator bodies 3 are obtained by the detection signal acquisition section 91.

If the resonator bodies 3 are driven with the same drive signal Sd, the phase differences θ thus detected are different from each other due to an individual difference in some cases. Therefore, the control device 9 is arrange to generate the reference phase difference θb based on the detection signals Ss of the plurality of resonator bodies 3 using the reference phase difference generation section 95, and to adjust (vary) the frequency f of the drive signal Sd so that the reference phase difference θb comes closer to the target value θ1 using the drive signal control section 94.

As an example, the reference phase difference generation section 95 firstly detects the phase difference θ between the drive signal Sd and the detection signal Ss in all of the resonator bodies 3 based on the detection signals Ss obtained by the detection signal acquisition section 91. Then, the reference phase difference generation section 95 obtains an average value of the phase differences θ of all of the resonator bodies 3, and then sets the average value to the reference phase difference θb. Then, the drive signal control section 94 adjusts the frequency f of the drive signal Sd so that the reference phase difference θb generated by the reference phase difference generation section 95 comes closer to the target value θ1. It should be noted that hereinafter, the control method described above is also referred to as a "fourth control method."

Citing a specific example, as shown in FIG. 17, the target value θ1 of the phase difference θ is set in the drive signal control section 94. The target value θ1 is set to a value close to the phase difference θp and existing on the side in which the frequency f is higher than the resonance frequency f0 similarly to the first control method described above. In the case shown in FIG. 17, the reference phase difference generation section 95 generates the reference phase difference θb, which is the average of the phase differences θ of the three resonator bodies 3A, 3B, and 3C. Then, the drive signal control section 94 shifts the frequency f of the drive signal Sd from the high-frequency side toward the low-frequency side to make the reference phase difference θb come closer to the target value θ1, or preferably coincide with the target value θ1.

Thus, since the phase differences θ of the resonator bodies 3A, 3B, and 3C each come closer to, or coincide with the target value θ1, it is possible to efficiently vibrate each of the resonator bodies 3A, 3B, and 3C. Therefore, it is possible to efficiently vibrate the plurality of resonator bodies 3 as a whole, and thus, the drive characteristics of the vibration actuator 30 are improved. Further, such control is the control based on the averaged reference phase difference θb, and is therefore hard to be affected by the individual differences (e.g., an individual difference between the resonator bodies 3 themselves, and a difference in pressing force against the rotor 2) between the resonator bodies 3A, 3B, and 3C, and accordingly, the robustness is improved.

It should be noted that it is preferable that the reference phase difference generation section 95 always or periodically regenerates the reference phase difference θb, and the drive signal control section 94 adjusts the frequency f so as to make the reference phase difference θb thus regenerated come closer to the target value θ1. Thus, more stable drive of the drive device 1 becomes possible.

The case (the fourth control method) in which the reference phase difference generation section 95 generates the average value of the phase differences θ of the respective resonator bodies 3 as the reference phase difference θb is hereinabove described, but the reference phase difference θb is not limited thereto. As another example, it is possible for the reference phase difference generation section 95 to combine the detection signals Ss from the respective resonator bodies 3 with each other to generate a single composite detection signal, and then obtain the phase difference between the drive signal Sd and the composite detection signal as the reference phase difference θb. Then, the drive signal control section 94 adjusts the frequency f of the drive signal Sd so that the reference phase difference θb generated by the reference phase difference generation section 95 comes closer to the target value θ1.

Thus, since the phase differences θ of the resonator bodies 3A, 3B, and 3C each come closer to, or coincide with the target value θ1, it is possible to efficiently vibrate each of the resonator bodies 3A, 3B, and 3C. Therefore, it is possible to efficiently vibrate the plurality of resonator bodies 3 as a whole, and thus, the drive characteristics of the vibration actuator 30 are improved. Further, such control is the control based on the reference phase difference θb generated from the composite detection signal, and is therefore hard to be affected by the individual differences (e.g., an individual difference between the resonator bodies 3 themselves, and a difference in pressing force against the rotor 2) between the resonator bodies 3A, 3B, and 3C, and accordingly, the robustness is improved.

The method of controlling the vibration actuator 30 by the control device 9 is hereinabove described. Such a control device 9 is the control device for the vibration actuator 30, having the rotor 2 (the driven body), and the plurality of resonator bodies 3 each having the transmission part 34 (a contact part) having contact with the rotor 2, and applying the common and alternating current drive signal Sd to the plurality of resonator bodies 3 to thereby cause the rotational vibration in the transmission parts 34 of the respective resonator bodies 3, then transmit the rotational vibration of the plurality of resonator bodies 3 to cause the rotor 2 to make a relative displacement. Further, the control device 9 is provided with the detection signal acquisition section 91 for obtaining the alternative-current detection signal Ss generated by the rotational vibration of the transmission part 34 from each of the resonator bodies 3, the reference phase difference generation section 95 for generating the reference phase difference θb, which is the phase difference from the drive signal Sd to be the reference based on the detection signal Ss obtained from each of the resonator bodies 3, and the drive signal control section 94 for adjusting the frequency f of the drive signal Sd so that the reference phase difference θb comes closer to the target value θ1. Thus, it is possible to efficiently vibrate each of the resonator bodies 3, and thus, the drive characteristics of the vibration actuator 30 are improved. Further, such control is the control based on the reference phase difference θb generated from the detection signals Ss of the respective resonator bodies 3, and is therefore hard to be affected by the individual differences (e.g., an individual difference between the resonator bodies 3 themselves, and a difference in pressing force against the rotor 2) between the resonator bodies 3, and thus, the robustness is improved.

Further, the method of controlling the vibration actuator 30 is a method of controlling the vibration actuator 30 having the rotor 2 (the driven body), and the plurality of resonator bodies 3 each having the transmission part 34 (the contact part) having contact with the rotor 2, and applying the common and alternating-current drive signal Sd to the plurality of resonator bodies 3 to thereby cause the rotational vibration in the transmission parts 34 of the respective resonator bodies 3, then transmit the rotational vibration of the plurality of resonator bodies 2 to cause the rotor 2 to make a relative displacement. In such a control method, the alternative-current detection signal Ss generated by the rotational vibration of the transmission part 34 is obtained from each of the resonator bodies 3, the reference phase difference θb which is the phase difference from the drive signal Sd to be the reference is generated based on the detection signal Ss obtained from each of the resonator bodies 3, and the frequency f of the drive signal Sd is adjusted so that the reference phase difference θb comes closer to the target value θ1. Thus, it is possible to efficiently vibrate each of the resonator bodies 3, and thus, the drive characteristics of the vibration actuator 30 are improved. Further, such control is the control based on the reference phase difference θb generated from the detection signals Ss of the respective resonator bodies 3, and is therefore hard to be affected by the individual differences (e.g., an individual difference between the resonator bodies 3 themselves, and a difference in pressing force against the rotor 2) between the resonator bodies 3, and thus, the robustness is improved.

Further, as described above, in the control device 9, the reference phase difference generation section 95 detects the phase difference θ between the drive signal Sd and the detection signal Ss with respect to each of the resonator bodies 3, and then obtains the average value of the phase differences θ of the resonator bodies 3 as the reference phase difference θb. Thus, the generation of the reference phase difference θb becomes easy. Further, it is possible to more efficiently vibrate each of the resonator bodies 3, and thus, the drive characteristics of the vibration actuator 30 are further improved.

According also to such a second embodiment as described above, substantially the same advantages as in the first embodiment described above can be exerted.

Third Embodiment

Then, a drive device according to a third embodiment of the invention will be described.

Figure 18:
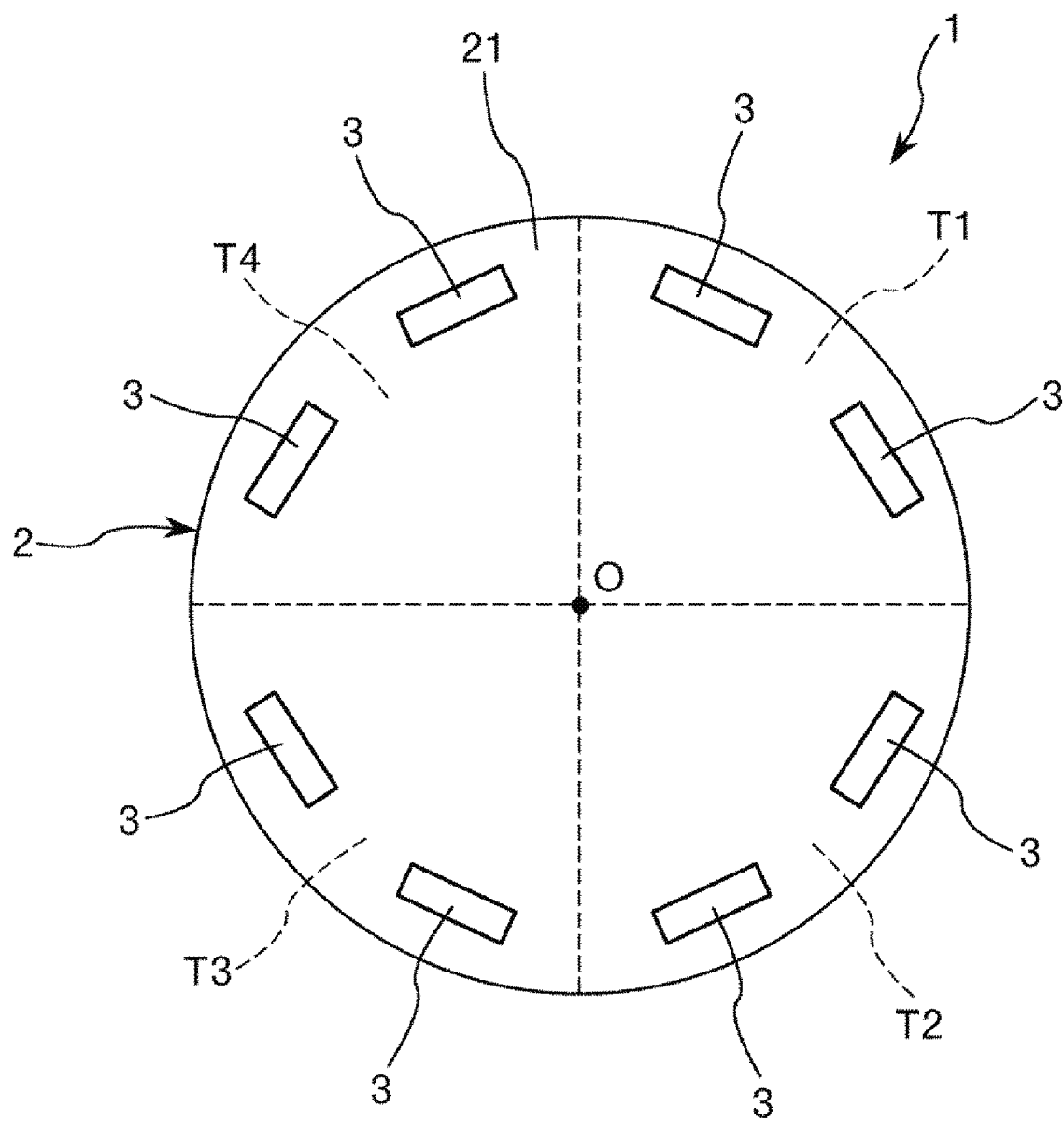
FIG. 18 is a plan view showing a drive device according to a third embodiment of the invention.

FIG. 18 is a plan view showing the drive device according to the third embodiment of the invention.

The drive device 1 of the third embodiment will hereinafter be described focusing mainly on the differences from the embodiments described above, and the description of substantially the same matters will be omitted.

The drive device 1 according to the third embodiment of the invention is substantially the same as that of the first embodiment described above except the fact that the number of the resonator bodies 3 and the control method by the control device 9 are different therefrom. It should be noted that the constituents substantially the same as those of the embodiment described above are denoted by the same reference symbols.

As shown in FIG. 18, in the drive device 1 of the present embodiment, the eight resonator bodies 3 are disposed around the rotational axis O of the rotor 2. It is assumed that it is known in advance that there is no substantial individual difference between the resonator bodies 3, and there is a difference in pressing force against the rotor 2 between the resonator bodies 3 in four areas T1, T2, T3, and T4. In such a case, since it is sufficient to focus substantively only on the pressing force in order to improve the robustness, it is possible for the control device 9 to perform the following control.

Similarly to the first embodiment described above, when the drive signal control section 94 applies the drive signal Sd to each of the resonator bodies 3, the transmission part 34 of each of the resonator bodies 3 rotationally vibrates (elliptically vibrates), and the rotor 2 rotates. It should be noted that the drive signal control section 94 applies the common drive signal Sd the same in frequency, amplitude, phase and so on to the resonator bodies 3. Further, the detection signal Ss corresponding to the rotational vibration (the elliptical vibration) is output from each of the resonator bodies 3. The detection signals Ss of the respective resonator bodies 3 are obtained by the detection signal acquisition section 91. Then, the phase difference detection section 92 selects one resonator body 3 from each of the areas T1, T2, T3, and T4 (totally four resonator bodies 3), and then detects the phase difference θ between the drive signal Sd and the detection signal Ss based on the detection signals Ss obtained by the detection signal acquisition section 91 for each of the four resonator bodies 3 thus selected. Then, the resonator body selection section 93 selects one from the four resonator bodies 3 selected by the phase difference detection section 92. On this occasion, as described in the first embodiment described above, it is possible for the resonator body selection section 93 to, for example, select the resonator body 3 the largest in phase difference θ, or select the resonator body 3 the smallest in phase difference θ. Further, the drive signal control section 94 shifts the frequency f of the drive signal Sd from the high-frequency side toward the low-frequency side to make the phase difference θ of the resonator body 3 selected by the resonator body selection section 93 come closer to the target value θ1, or preferably coincide with the target value θ1.

According also to such a method, similarly to the first embodiment described above, the drive characteristics of the vibration actuator 30 are improved, and at the same time, the robustness is improved. In particular, since the detection signals Ss of all of the resonator bodies 3 are not used for the drive control, in other words, since some of the resonator bodies 3 are selected from the plurality of resonator bodies 3 provided to the vibration actuator 30 and the control is performed using the resonator bodies 3 thus selected, the burden of the control device 9 is reduced, and the processing speed of the control device 9 is improved. Therefore, it becomes possible to achieve more accurate drive control of the vibration actuator 30.

According also to such a third embodiment as described above, substantially the same advantages as in the first embodiment described above can be exerted.

It should be noted that it is assumed that it is known in advance that the resonator bodies 3 are substantially equal in pressing force against the rotor 2 to each other and there is an individual difference between the resonator bodies 3 in the four areas T1, T2, T3, and T4 in contrast to the present embodiment. In such a case, it is sufficient to focus substantively only on the individual difference of the resonator bodies 3 in order to improve the robustness, and it becomes possible to adopt substantially the same control method as in the present embodiment.

Fourth Embodiment

Then, a robot according to a fourth embodiment of the invention will be described.

Figure 19:
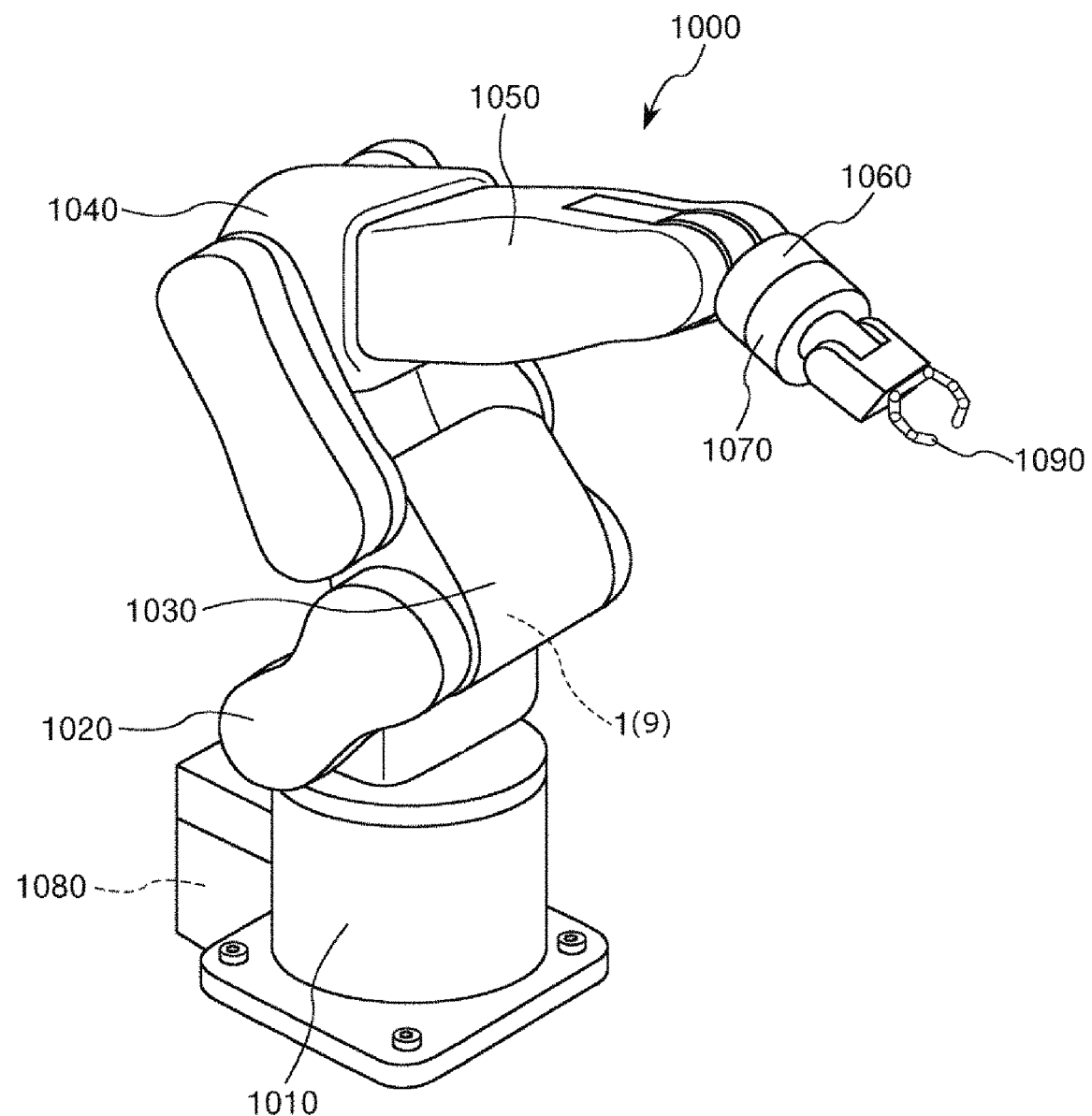
FIG. 19 is a perspective view showing a robot according to a fourth embodiment of the invention.

FIG. 19 is a perspective view showing the robot according to the fourth embodiment of the invention.

The robot 1000 shown in FIG. 19 is capable of performing operations such as feeding, removing, transmission, and assembling of precision mechanical equipment or a component constituting the precision mechanical equipment. The robot 1000 is a six-axis robot, and is provided with a base 1010 fixed to the floor or the ceiling, an arm 1020 rotatably connected to the base 1010, an arm 1030 rotatably connected to the arm 1020, an arm 1040 rotatably connected to the arm 1030, an arm 1050 rotatably connected to the arm 1040, an arm 1060 rotatably connected to the arm 1050, an arm 1070 rotatably connected to the arm 1060, and a robot control section 1080 for controlling drive of these arms 1020, 1030, 1040, 1050, 1060, and 1070. Further, the arm 1070 is provided with a hand connection section, and to the hand connection section, there is attached an end effector 1090 corresponding to an operation to be performed by the robot 1000. Further, the drive device 1 is installed in some or all of the joint sections, and due to the drive of the drive device 1, each of the arms 1020, 1030, 1040, 1050, 1060, and 1070 rotates. It should be noted that the drive of each of the drive devices 1 is controlled by the robot control section 1080. Further, it is also possible for the drive device 1 to be installed in the end effector 1090 and used for drive of the end effector 1090.

Such a robot 1000 is provided with the control device 9 for the vibration actuator 30 incorporated in the drive device 1. Therefore, it is possible to appreciate the advantages of the control device 9 described above, and the high reliability can be exerted.

Fifth Embodiment

Then, an electronic component conveyance apparatus according to a fifth embodiment of the invention will be described.

Figure 20:
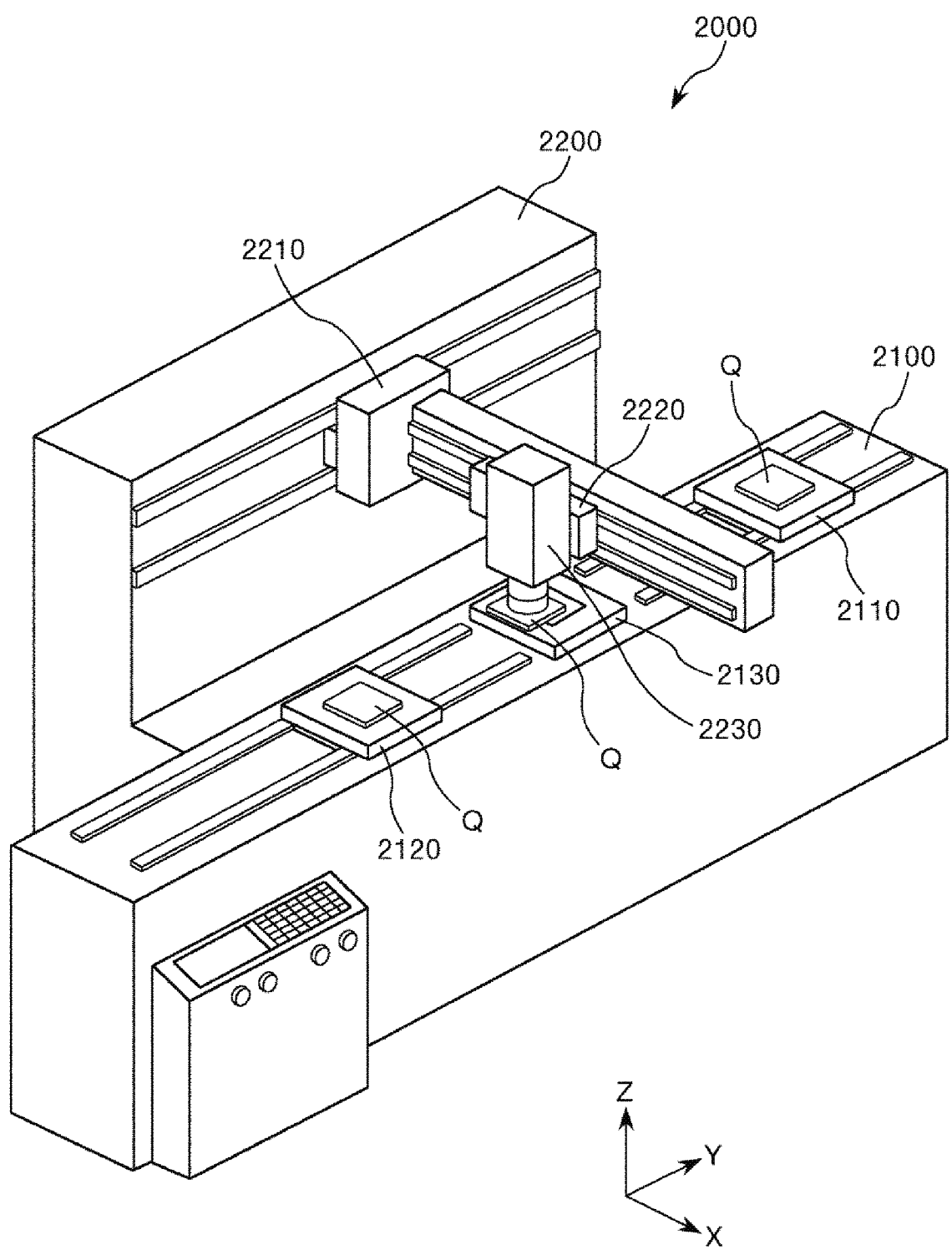
FIG. 20 is a perspective view showing an electronic component conveyance apparatus according to a fifth embodiment of the invention.
Figure 21:
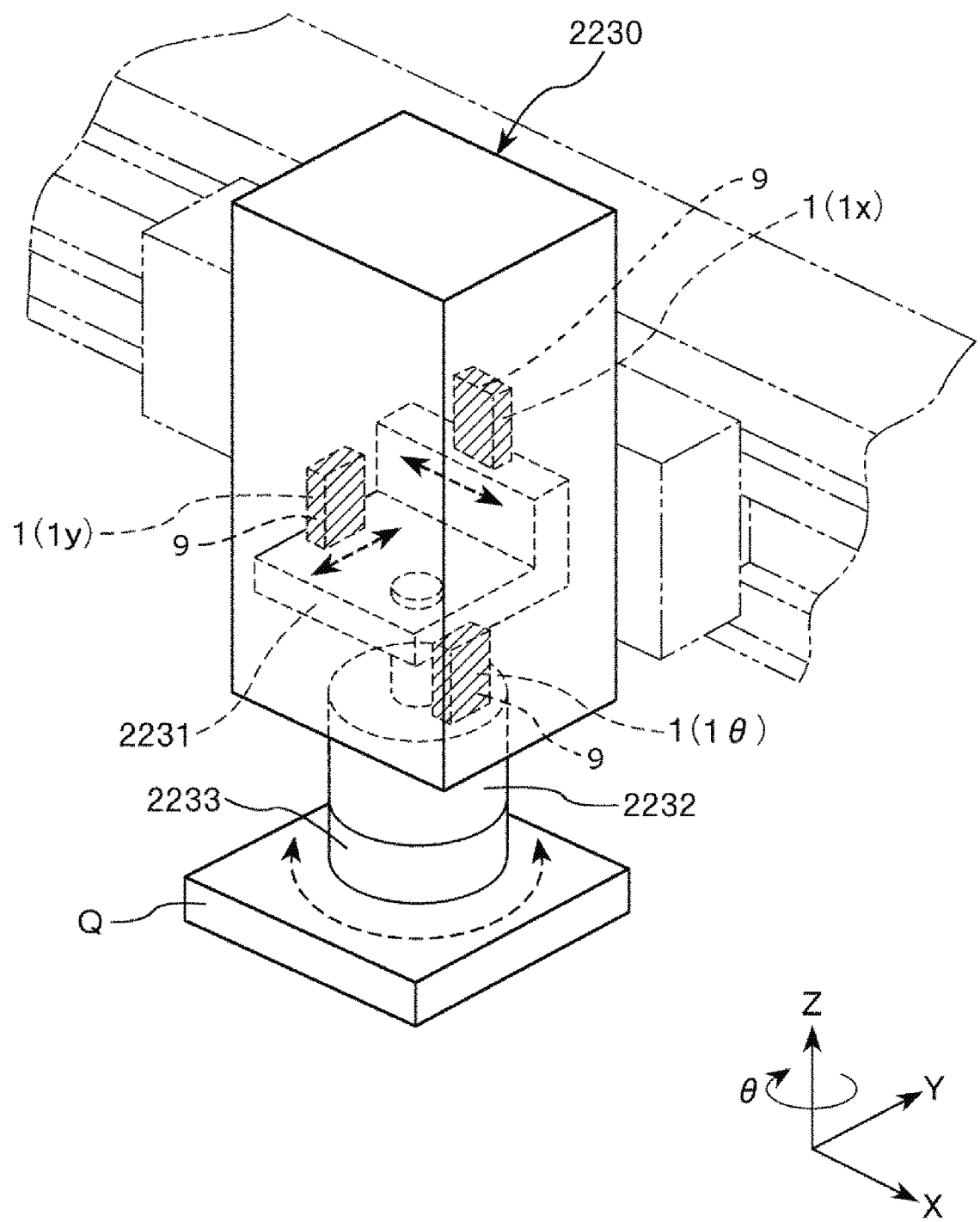
FIG. 21 is a perspective view showing an electronic component holding section provided to the electronic component conveyance apparatus shown in FIG. 20.

FIG. 20 is a perspective view showing the electronic component conveyance apparatus according to the fifth embodiment of the invention. FIG. 21 is a perspective view showing an electronic component holding section provided to the electronic component conveyance apparatus shown in FIG. 20. It should be noted that the three axes perpendicular to each other are hereinafter defined as an X axis, a Y axis, and a Z axis, respectively for the sake of convenience of explanation.

The electronic component conveyance apparatus 2000 shown in FIG. 20 is applied to an electronic component inspection system, and is provided with a base 2100, and a support platform 2200 lateral to the base 2100. Further, the base 2100 is provided with an upstream side stage 2110, a downstream side stage 2120, and an inspection stage 2130, wherein an electronic component Q as an inspection object is mounted on the upstream side stage 2110 and is conveyed in the Y-axis direction, the electronic component Q having been inspected is mounted on the downstream side stage 2120 and is conveyed in the Y-axis direction, the inspection stage 2130 is located between the upstream side stage 2110 and the downstream side stage 2120, and the electrical characteristics of the electronic component Q are inspected on the inspection stage 2130. It should be noted that as an example of the electronic component Q, there can be cited, for example, a semiconductor, a semiconductor wafer, a display device such as a CLD or an OLED, a liquid crystal device, a variety of types of sensors, an inkjet head, and a variety of types of MEMS devices.

Further, the support platform 2200 is provided with a Y stage 2210, which can move in the Y-axis direction relative to the support platform 2200, the Y stage 2210 is provided with an X stage 2220, which can move in the X-axis direction relative to the Y stage 2210, and the X stage 2220 is provided with the electronic component holding section 2230, which can move in the Z-axis direction relative to the X stage 2220.

Further, as shown in FIG. 21, the electronic component holding section 2230 is provided with a fine-tuning plate 2231, a rotating part 2232, and a holding part 2233, wherein the fine-tuning plate 2231 can move in the X-axis direction and the Y-axis direction, the rotating part 2232 can rotate around the Z axis relative to the fine-tuning plate 2231, and the holding part 2233 is provided to the rotating part 2232 and holds the electronic component Q. Further, the electronic component holding section 2230 incorporates the drive device 1 (1*x*) for moving the fine-tuning plate 2231 in the X-axis direction, the drive device 1 (1*y*) for moving the fine-tuning plate 2231 in the Y-axis direction, and the drive device 1 (1θ) for rotating the rotating part 2232 around the Z axis. It should be noted that it is possible to use those having the configuration shown in FIG. 2 described above as the drive devices 1*x*, 1*y*, and it is possible to use one having the configuration shown in FIG. 1 described above as the drive device 1θ.

Such an electronic component conveyance apparatus 2000 is provided with the control device 9 for the vibration actuator 30 incorporated in the drive device 1. Therefore, it is possible to appreciate the advantages of the control device 9 described above, and the high reliability can be exerted.

Sixth Embodiment

Then, a printer according to a sixth embodiment of the invention will be described.

Figure 22:
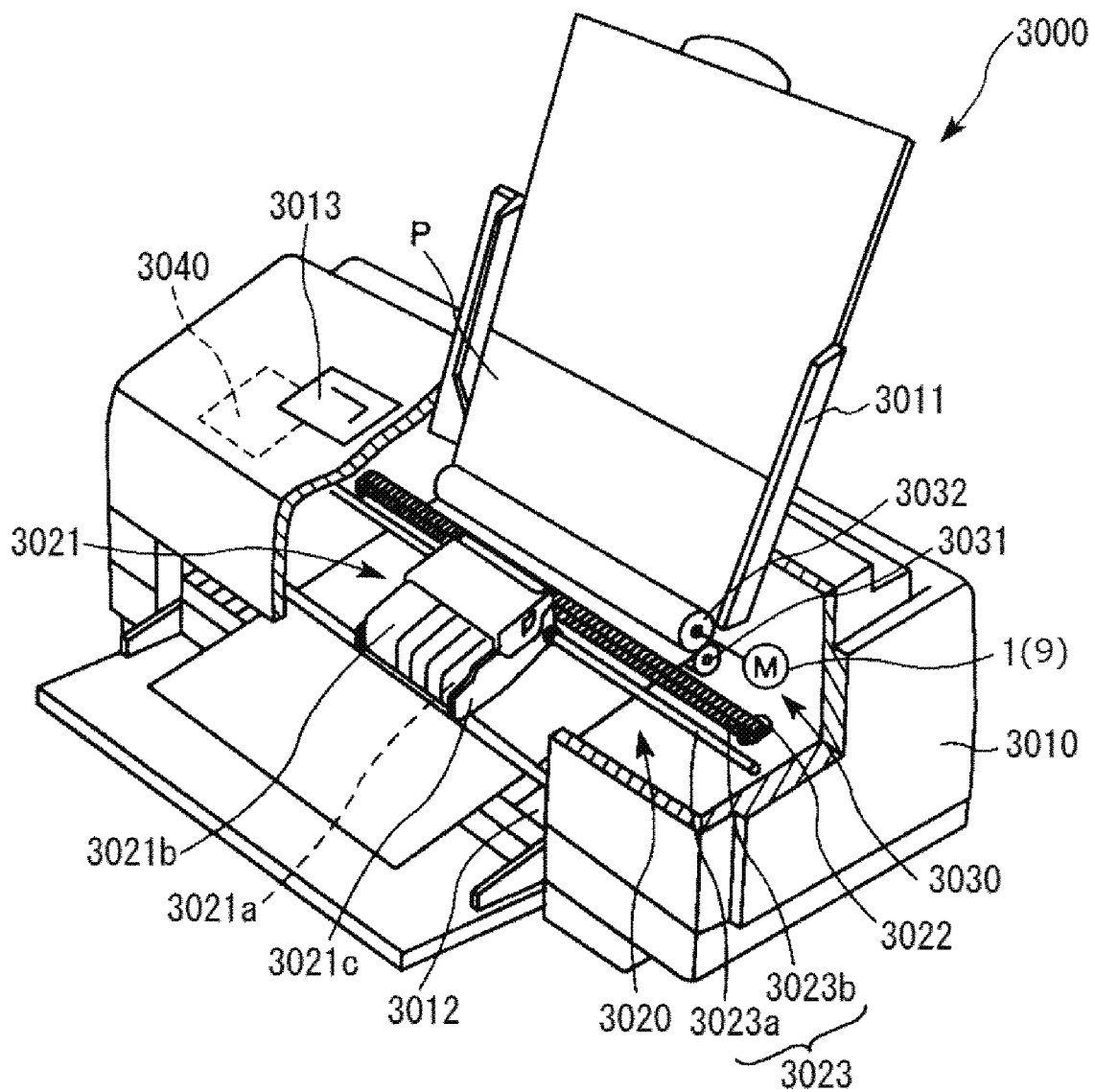
FIG. 22 is a schematic diagram showing an overall configuration of a printer according to a sixth embodiment of the invention.

FIG. 22 is a schematic diagram showing an overall configuration of the printer according to the sixth embodiment of the invention.

The printer 3000 shown in FIG. 22 is provided with a device main body 3010, a printing mechanism 3020, a paper-feeding mechanism 3030, and a control section 3040, wherein the printing mechanism 3020, the paper-feeding mechanism 3030, and the control section 3040 are disposed inside the device main body 3010. Further, the device main body 3010 is provided with a tray 3011 for installing recording sheets P, a paper ejection port 3012 for ejecting the recording sheets P, and an operation panel 3013 such as a liquid crystal display.

The printing mechanism 3020 is provided with a head unit 3021, a carriage motor 3022, and a reciprocating mechanism 3023 for reciprocating the head unit 3021 due to the drive force of the carriage motor 3022. Further, the head unit 3021 is provided with a head 3021*a* as an inkjet recording head, an ink cartridge 3021*b* for supplying the head 3021*a* with ink, and a carriage 3021*c* on which the head 3021*a* and the ink cartridge 3021*b* are mounted.

The reciprocating mechanism 3023 is provided with a carriage guide shaft 3023*a* supporting the carriage 3021*c* so as to be able to reciprocate, and a timing belt 3023*b* for moving the carriage 3021*c* on the carriage guide shaft 3023*a* due to the drive force of the carriage motor 3022.

The paper-feeding mechanism 3030 is provided with a driven roller 3031 and a drive roller 3032 having pressure contact with each other, and the drive device 1 as a paper-feeding motor for driving the drive roller 3032.

The control section 3040 controls the printing mechanism 3020, the paper-feeding mechanism 3030, and so on based on the print data input from a host computer such as a personal computer.

In such a printer 3000, the paper-feeding mechanism 3030 intermittently feeds the recording sheet P to the vicinity of a lower part of the head unit 3021 sheet by sheet. On this occasion, the head unit 3021 reciprocates in a direction roughly perpendicular to the feeding direction of the recording sheet P to perform printing on the recording sheet P.

Such a printer 3000 is provided with the control device 9 for the vibration actuator 30 incorporated in the drive device 1. Therefore, it is possible to appreciate the advantages of the control device 9 described above, and the high reliability can be exerted. It should be noted that the drive device 1 drives the drive roller 3032 for paper-feeding in the present embodiment, but can also drive, for example, the carriage 3021*c* besides the drive roller 3032.

Seventh Embodiment

Then, a projector according to a seventh embodiment of the invention will be described.

Figure 23:
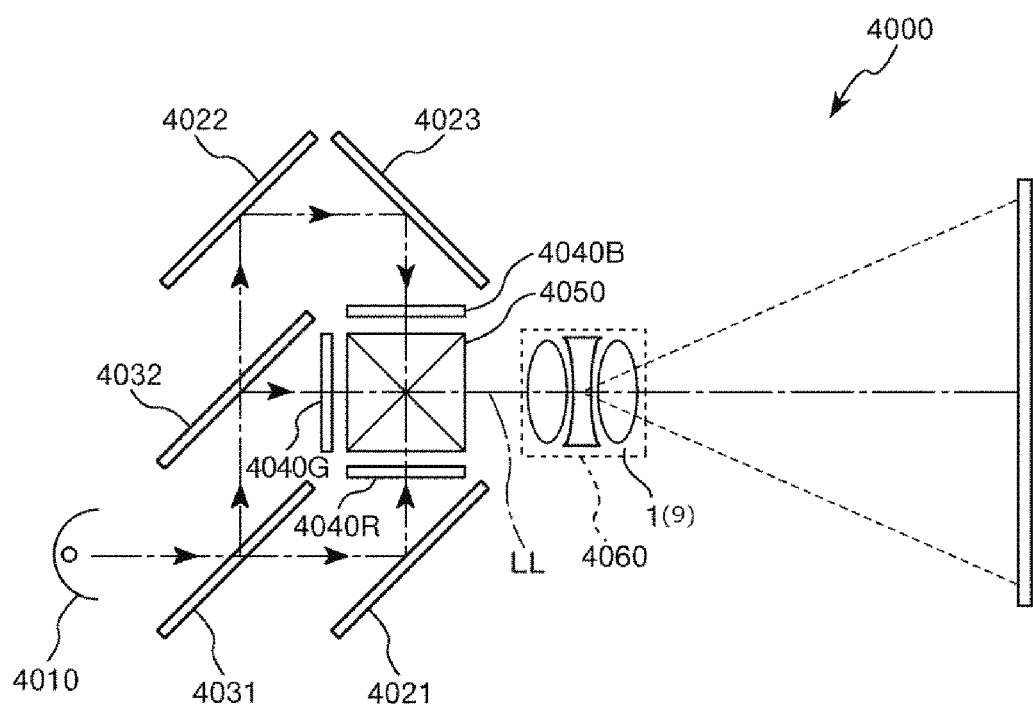
FIG. 23 is a schematic diagram showing an overall configuration of a projector according to a seventh embodiment of the invention.

FIG. 23 is a schematic diagram showing an overall configuration of a projector according to the seventh embodiment of the invention.

The projector 4000 shown in FIG. 23 is a projector of an LCD type, and is provided with a light source 4010, mirrors 4021, 4022, and 4023, dichroic mirrors 4031, 4032, liquid crystal display elements 4040R, 4040G, and 4040B, a dichroic prism 4050, a projection lens system 4060, and the drive device 1.

As the light source 4010, there can be cited, for example, a halogen lamp, a mercury lamp, and a light emitting diode (LED). Further, as the light source 4010, there is used a device for emitting white light. Then, the light emitted from the light source 4010 is firstly separated by the dichroic mirror 4031 into red light (R) and the rest of the light. The red light is reflected by the mirror 4021, then enters the liquid crystal display element 4040R, and the rest of the light is further separated by the dichroic mirror 4032 into green light (G) and blue light (B). Then, the green light enters the liquid crystal display element 4040G, and the blue light is reflected by the mirrors 4022, 4023, and then enters the liquid crystal display element 4040B.

The liquid crystal display elements 4040R, 4040G, and 4040B are each used as a spatial light modulator. These liquid crystal display elements 4040R, 4040G, and 4040B are transmissive spatial light modulators corresponding respectively to the primary colors of R, G, and B, and are each provided with pixels arranged in, for example, a 1080×1920 matrix. In each of the pixels, the light intensity of the transmitted light with respect to the incident light is controlled, and in each of the liquid crystal display elements 4040R, 4040G, and 4040B, the light intensity distribution of all of the pixels is controlled in a coordinated manner. The light beams spatially modulated by such liquid crystal display elements 4040R, 4040G, and 4040B are combined by the dichroic prism 4050, and full-color picture light LL is emitted from the dichroic prism 4050. Then, the picture light LL thus emitted is enlarged and projected on, for example, a screen by the projection lens system 4060. The drive device 1 is capable of moving at least one lens included in the projection lens system 4060 in the optical axis direction to change the focal distance.

Such a projector 4000 is provided with the control device 9 for the vibration actuator 30 incorporated in the drive device 1. Therefore, it is possible to appreciate the advantages of the control device 9 described above, and the high reliability can be exerted.

Although the control device for a vibration actuator, the method of controlling the vibration actuator, the robot, the electronic component conveyance apparatus, the printer, the projector, and the vibration device according to the invention are hereinabove described based on the illustrated embodiments, the invention is not limited to the embodiments, but the configuration of each of the constituents can be replaced with one having an equivalent function and an arbitrary configuration. Further, it is also possible to add any other constituents to the invention. Further, it is also possible to arbitrarily combine any of the embodiments with each other.

Further, in the embodiments described above, the configurations of applying the control device for a vibration actuator to the robot, the electronic component conveyance apparatus, the printer, the projector and the vibration device are described, but the drive device can also be applied to a variety of types of electronic devices besides the above.

The entire disclosure of Japanese Patent Application No. 2017-088256, filed Apr. 27, 2017 is expressly incorporated by reference herein.

What is claimed is:

1. A control device for a vibration actuator including a driven body and a plurality of resonator bodies having a contact part having contact with the driven body, and causing a rotational vibration in the contact parts of the plurality of resonator bodies by application of a common alternating-current drive signal to the plurality of resonator bodies, and transmitting the rotational vibrations of the plurality of resonator bodies to cause the driven body to make a relative displacement, the control device comprising:
   a detection signal acquisition section adapted to obtain an alternating-current detection signal corresponding to a vibration of the resonator body from the resonator bodies;
   a phase difference detection section adapted to detect a phase difference between the drive signal and the detection signal with respect to the resonator bodies;
   a resonator body selection section adapted to select one from the resonator bodies; and
   a drive signal control section adapted to adjust a frequency of the drive signal so that the phase difference in the resonator body selected comes closer to a target value.

2. The control device for a vibration actuator according to claim 1, wherein
   the drive signal control section adjusts the frequency of the drive signal within a range higher than a resonance frequency of the resonator body.

3. The control device for a vibration actuator according to claim 1, wherein
   in a relationship between the phase difference and the frequency of the drive signal, the target value is set on a high-frequency side with respect to the resonance frequency.

4. The control device for a vibration actuator according to claim 1, wherein
   the resonator body selection section selects the resonator body largest in the phase difference from the plurality of resonator bodies.

5. The control device for a vibration actuator according to claim 1, wherein
   the resonator body selection section selects the resonator body smallest in the phase difference from the plurality of resonator bodies.

6. A control device for a vibration actuator including a driven body and a plurality of resonator bodies having a contact part having contact with the driven body, and causing a rotational vibration in the contact parts of the plurality of resonator bodies by application of a common alternating-current drive signal to the plurality of resonator bodies, and transmitting the rotational vibrations of the plurality of resonator bodies to cause the driven body to make a relative displacement, the control device comprising:
   a detection signal acquisition section adapted to obtain an alternating-current detection signal generated by the rotational vibration of the contact part from the resonator bodies;
   a reference phase difference generation section adapted to generate a reference phase difference as a phase difference from the drive signal to be a reference based on a detection signal obtained from the resonator bodies; and
   a drive signal control section adapted to adjust a frequency of the drive signal so that the reference phase difference comes closer to a target value.

7. The control device for a vibration actuator according to claim 6, wherein
   the reference phase difference generation section detects the phase difference between the drive signal and the detection signal for the resonator bodies, and then obtains an average value of the phase differences in the respective resonator bodies as the reference phase difference.

8. A method of controlling a vibration actuator including a driven body and a plurality of resonator bodies having a contact part having contact with the driven body, and causing a rotational vibration in the contact parts of the plurality of resonator bodies by application of a common alternating-current drive signal to the plurality of resonator bodies, and transmitting the rotational vibrations of the plurality of resonator bodies to cause the driven body to make a relative displacement, the method comprising:
   obtaining an alternating-current detection signal corresponding to a vibration of the resonator body from the resonator bodies;
   detecting a phase difference between the drive signal and the detection signal with respect to the resonator bodies;
   selecting one from the resonator bodies; and adjusting a frequency of the drive signal so that the phase difference in the resonator body selected comes closer to a target value.

9. A method of controlling a vibration actuator including a driven body and a plurality of resonator bodies having a contact part having contact with the driven body, and causing a rotational vibration in the contact parts of the plurality of resonator bodies by application of a common alternating-current drive signal to the plurality of resonator bodies, and transmitting the rotational vibrations of the plurality of resonator bodies to cause the driven body to make a relative displacement, the method comprising:
- obtaining an alternating-current detection signal generated by the rotational vibration of the contact part from the resonator bodies;
- generating a reference phase difference as a phase difference from the drive signal to be a reference based on a detection signal obtained from the resonator bodies; and
- adjusting a frequency of the drive signal so that the reference phase difference comes closer to a target value.

10. A robot comprising:
the control device for a vibration actuator according to claim 1.

11. A robot comprising:
the control device for a vibration actuator according to claim 2.

12. A robot comprising:
the control device for a vibration actuator according to claim 3.

13. An electronic component conveyance apparatus, comprising:
the control device for a vibration actuator according to claim 1.

14. An electronic component conveyance apparatus, comprising:
the control device for a vibration actuator according to claim 2.

15. An electronic component conveyance apparatus, comprising:
the control device for a vibration actuator according to claim 3.

16. A printer comprising:
the control device for a vibration actuator according to claim 1.

17. A printer comprising:
the control device for a vibration actuator according to claim 2.

18. A projector comprising:
the control device for a vibration actuator according to claim 1.

19. A projector comprising:
the control device for a vibration actuator according to claim 2.

20. A vibration device comprising:
a driven body;
a plurality of resonator bodies having a contact part having contact with the driven body; and
a processor,
wherein the vibration device causes a rotational vibration in the contact parts of the plurality of resonator bodies by application of a common alternating-current drive signal to the plurality of resonator bodies to thereby, and transmits the rotational vibrations of the plurality of resonator bodies to cause the driven body to make a relative displacement, and
the processor obtains an alternating-current detection signal corresponding to a vibration of the resonator body from the resonator bodies, detects a phase difference between the drive signal and the detection signal with respect to the resonator bodies, selects one from the resonator bodies, and adjusts a frequency of the drive signal so that the phase difference in the resonator body selected comes closer to a target value.

* * * * *